(12) United States Patent
Viscor et al.

(10) Patent No.: US 7,399,987 B1
(45) Date of Patent: Jul. 15, 2008

(54) PLANAR ELECTRON EMITTER (PEE)

(76) Inventors: Petr Viscor, Skjoldenaesvej 17, DK-4174 Jystrup (DK); Niels Ole Nielsen, Engetvedvej 10, DK-8653 Them (DK); Armin Delong, Kalvodova 25, 60200 Brno (CZ); Vladimir Kolarik, Jecna 32, 62100 Brno (CZ)

( * ) Notice: Subject to any disclaimer, the term of this patent is extended or adjusted under 35 U.S.C. 154(b) by 0 days.

(21) Appl. No.: 09/700,463

(22) PCT Filed: Jun. 11, 1999

(86) PCT No.: PCT/DK99/00323

§ 371 (c)(1),
(2), (4) Date: Dec. 21, 2000

(87) PCT Pub. No.: WO99/65050

PCT Pub. Date: Dec. 16, 1999

(51) Int. Cl.
*H01J 19/24* (2006.01)
(52) U.S. Cl. .................................... 257/10; 313/496
(58) Field of Classification Search ............... 257/10, 257/44, 79, E33.044, E31.049, E21.004; 313/309, 310, 313, 496; 258/492.24; 369/101, 369/121; 361/225
See application file for complete search history.

(56) References Cited

U.S. PATENT DOCUMENTS

| 4,303,930 | A | | 12/1981 | Van Gorkom et al. |
| 4,506,284 | A | * | 3/1985 | Shannon .................. 313/346 R |
| 4,683,399 | A | | 7/1987 | Soclof |
| 4,801,994 | A | | 1/1989 | Van Gorkom et al. |

(Continued)

FOREIGN PATENT DOCUMENTS

EP   0 150 885 A2   8/1985

(Continued)

OTHER PUBLICATIONS

L.F. Eastman et al., "Ballistic Electron Motion in GaAs at Room Temperature", *Electronics Letters*, Jun. 19, 1980, vol. 16, No. 13 pp. 524-525.

(Continued)

*Primary Examiner*—Thomas L. Dickey
*Assistant Examiner*—Fazli Erdem
(74) *Attorney, Agent, or Firm*—Oliff & Berridge, PLC

(57) ABSTRACT

A planar electron emitter, based on the existence of quasi-ballistic transport of electrons is disclosed. In its preferred embodiment the planar electron emitter structure consists of a body of finite gap pure semiconductor or insulator, the said body of macroscopic thickness (~1 mm) being terminated by two parallel surfaces and of a set of two electrodes deposited/grown on the said two free surfaces such that when a low external electrical field (~100 V/cm) is applied to this structure, consisting of two electrodes and the said semiconductor or insulating body sandwiched between them, a large fraction of electrons injected into the said semiconductor or insulator body from the negatively charged electrode (cathode) is quasi-ballistic in nature, that is this fraction of injected electrons is accelerated within the said semiconductor or insulator body without suffering any appreciable inelastic energy losses, thereby achieving sufficient energy and appropriate momentum at the positively charged electrode (anode) to be able to traverse through the said anode and to escape from the said structure into empty space (vacuum), said semiconductor or insulator body comprises a material or material system having a predetermined crystal orientation.

31 Claims, 24 Drawing Sheets

U.S. PATENT DOCUMENTS

| | | | |
|---|---|---|---|
| 4,823,004 A | 4/1989 | Kaiser et al. |
| 5,202,605 A | 4/1993 | Kaneko et al. |
| 5,212,426 A | 5/1993 | Kane |
| 5,229,682 A | 7/1993 | Komatsu |
| 5,280,221 A | 1/1994 | Okamoto et al. |
| 5,340,997 A | 8/1994 | Kuo |
| 5,444,328 A | 8/1995 | Van Zutphen |
| 5,463,275 A | 10/1995 | Chen et al. |
| 5,528,103 A | 6/1996 | Spindt et al. |
| 5,534,859 A | 7/1996 | Meyer |
| 5,536,193 A | 7/1996 | Kumar |
| 5,554,859 A | 9/1996 | Tsukamoto et al. |
| 5,616,944 A | 4/1997 | Mizutani et al. |
| 5,627,479 A | 5/1997 | Viscor et al. |
| 5,631,196 A | 5/1997 | Kane et al. |
| 5,703,435 A | 12/1997 | Kumar et al. |
| 5,712,490 A | 1/1998 | Smith |
| 5,729,094 A * | 3/1998 | Geis et al. ............. 315/169.1 |

FOREIGN PATENT DOCUMENTS

| | | | |
|---|---|---|---|
| EP | 0 367 195 A2 | 5/1990 |
| EP | 0 441 440 A1 | 8/1991 |
| EP | 0 504 603 A1 | 9/1992 |
| EP | 0 601 637 A1 | 6/1994 |
| GB | 1 223 729 | 3/1971 |
| GB | 1 303 659 | 1/1973 |
| HU | 208 764 B | 12/1993 |
| WO | WO 94/14078 | 6/1994 |

OTHER PUBLICATIONS

A. Delong et al., "A 1:1 electron stepper", Journal of Vacuum Science & Technology B7 No. 6, Nov./Dec. 1989, pp. 1422-1425.

S. M. Sze, "Physics of Semiconductor Devices", John Wiley, 1981 p. 184.

K.W. Boer, "Survey semiconductor physics", vol. II Van Nostrand Reinhold 1992.

Mankos et al., "Imaging Hot-Electron Emission from Metal-Oxide-Semiconductor Structures", Physical Review Letters, vol. 76, 17 (1996).

H. Ahmed et al., "Proceedings of the Conference on Microlithography", Cavendish Laboratory, Cambridge 1989.

* cited by examiner 0.15μm feature

US 7,399,987 B1

PLANAR ELECTRON EMITTER (PEE)

FIELD OF THE INVENTION

The present invention relates to a new way to use semiconductor or insulator substrates for creating and conducting quasi-ballistic electrons when exposed to small electric fields. This will make it possible to accelerate electrons within the said semiconductor or insulator body without suffering any appreciable inelastic energy losses. The primary embodiments will be planar electron emitters such as in flat panel displays and Planar Electron Beam Lithography.

A number of apparatuses, using the said (disclosed) planar electron emitter in various fields of application, are also disclosed and the priority rights for the said apparatuses are also claimed.

BACKGROUND OF THE INVENTION

The present invention concerns quasi-ballistic transport of electrons in high resistivity semiconductors or insulators, when exposed to small (around 100 V/cm) electric fields. Quasi-ballistic transport means that electron scattering is reduced to a minimum so that the electron mean free path becomes macroscopic. This effect has so far only been detected in semiconductors when very large electric field strengths are applied over very short distances and/or the semiconductor is cooled down to very low temperatures. A semiconductor or insulator material with the above properties will hereafter be mentioned Quasi-Ballistic Semiconductor or QB-Sem.

The quasi-ballistic transport can be utilised in a number of ways. In this application these will be separated into two major fields:

1. Electron transmitting semiconductors, where it is the transport properties of the quasi-ballistic electrons inside the material which are the characteristic property, and
2. Electron sources, where it is the property of quasi-ballistic electrons to be emitted from the substrate which are the characteristic property.

None of the relevant prior art mentions ballistic electrons in highly resistive semiconductors or insulators, neither when exposed to large electrical fields. This fact is due to the general opinion of quasi-ballistic transport in semiconductors. The possibility of quasi-ballistic transport in high resistive materials is counter intuitive and have therefore never been sought for so far. The understanding of the essential physics of this quasi-ballistic transport process have been that, as long as the applied electrical field E is within ohmic range (mobile charge carriers' concentrations and electrical mobility are constant and independent of the electric field E) and the thickness of the said piece of semiconducting or insulating material is larger than the mean free path of the mobile charge carriers (at best of the order of some one to two thousand Angstroms), then the current component from ballistic electrons is negligibly small, leading to essentially zero value of electron emission. (For references, see S. M. Sze: Physics of semiconductor devices; John Wiley 1981 or K. W. Boer: Survey of semiconductor physics, vol. II; Van Nostrand Reinhold 1992)

1. Electron Transmitting Semiconductors

The quasi-ballistic transport of electrons in high resistivity semiconductors or insulators, when exposed to small (around 100 V/cm) electric fields, is a property, which can be used in more or less any semiconductor component or device.

Semiconductor components and devices cover a vast field of applications and the patents and references within the area are numerous. Four major classes of applications have been made with examples of products in each class.

Class A: Rectification and Charge (Information) Storage.
Semiconductor components/devices in this class include Schottky barrier diodes (U.S. Pat. No. 5,627,479 and EP672 257 B1), bipolar p-n, p-i-n diodes, thyristors as well as a number of unipolar devices such as MIS (Metal-Insulator-Semiconductor) diodes, CCD (Charge-Coupled Devices), MIS tunnel diodes, MIS switch diodes, IMPATT (Impact Ionisation Avalanche Transit Time) and BARITT (Barrier Injection and Transit Time) diodes and other related Transit Time devices.

Class B: Photo-Sensing and Photo-Emitting Devices
This class of semiconducting components/devices include among others LEDs' (Light Emitting Diodes), Photodiodes, Semiconducting Lasers, Avalanche diodes and other photoconducting devices for light to electrical signal conversion purposes.

Class C: Amplification and Non-Volatile Memory
Applications of the present invention in this class of semiconductor components/devices include bipolar transistors and bipolar unijunction transistors, together with a number of unipolar components and devices inclusive FETs (Field Effect Transistor), JFETs (Junction Field Effect Transistor), MESFETs (Metal-Semiconductor Field Effect Transistor), MOSFETs (Metal-Oxide-Semiconductor Field Effect Transistor) and Non-Volatile Memory devices. Particularly relevant in relation to present invention within this class are tunnel transistors, TEDs (Transferred-Electron Devices) and other ballistic (Hot Electron) transistors and/or devices.

Class D: Optical Image Detection, Formation and Processing
Semiconductor camera, Conversion of electrical signals to 2D-optical images/signals, 2D-optical image/signal brightness/contrast amplification and spatial magnification.

Ballistic or hot electron devices as they are sometimes called, have been anticipated (see for example S. M. Sze: Physics of semiconductor devices; John Wiley 1981, p. 184, but also K. W. Boer: Survey of semiconductor physics, vol. II; Van Nostrand Reinhold 1992, p. 1265 and 1247), but the proposed structures are costly to produce and unreliable, requiring extremely small dimensions (of the order of one hundred Angstroms) and high electrical fields.

2. Electron Sources

The present invention relates to a general class of electron devices termed "electron sources" and more specifically to a subclass termed "planar electron sources". All of these devices provide a beam of electrons that can move through the empty space and be used for various technological applications.

The essential requirement for all electron sources is to provide sufficient amount of electrons at the emitting surface of the device (the surface of the device facing the vacuum) with sufficient amount of energy (3-5 eV in most cases) and a velocity in the direction of emitting surface in order that these electrons can surmount the energy barrier at the emitting surface—vacuum interface and escape from the material into vacuum. The energy barrier is roughly given by the energy difference between the vacuum level and the electron chemical potential at the emitting surface. The necessary amount of energy can be supplied by any of the following means:

Heating the emitting surface ("Thermal emission" electron sources)

Establishing a sufficiently high electrical field in the region emitting surface-vacuum ("Field emission" electron sources)

Sufficient acceleration of electrons within the bulk region of the device in the direction towards the emitting surface ("Tunnelling field emission" and/or "Quasi-ballistic field emission" electron sources).

Illumination of the emitting surface with help of photons or other energetic particles ("Photo emission" electron sources).

Lowering of the said energy barrier at the emitting surface-vacuum interface ("Negative electron affinity emission" electron sources).

or by the combination of any of the above methods.

While for some applications a point source electron beam is required, where the electrons are subsequently accelerated and electro-optically modulated, there are a large number of technological applications, where a planar source of electrons is required and/or would be advantageous. All of the prior art to be used in these applications, relate to small pointlike emission regions from a specific material detail at that point. A larger planar electron emitter can only be achieved by making an array of such small regions. Moreover, most devices need an opening in the anode for the electrons to escape into vacuum.

There is a very large number of inventions, as can be seen for example from citations in the U.S. Pat. No. 5,703,435 (December 1997) and the U.S. Pat. No. 5,534,859 (September 1996), that all relate to planar electron emitters with the main emphasis on the use of these inventions as basic building blocks in field emission Flat Panel Displays.

Most of the prior art can be broadly divided into two classes.

Class 1

In the first class the emitting cathode-anode structures are usually of all solid state construction and are formed from a combination of metallic, semiconducting and insulating materials in order to establish the necessary conditions for the electron field emission to take place at the anode surface-empty space interface. The intentions of these devises are to improve electron emission efficiency, all using the same basic cathode with several substances disposed thereon. Electrons are emitted from the semiconductor surface into free space though an aperture of the anode. The principle is to narrow the semiconductor-free space barrier and to give the electrons the momentum to escape and/or tunnel through the electric potential barrier of an anode. Any of the above mentioned means can be applied in order to increase the electron emission current $I_{em}$.

It is a particularly characteristic feature of a majority of solid state devices in class one of the prior art, that the necessary large external voltages have to be applied over relatively very short distances (of the order of the electron mean free path), in order to generate sufficiently strong electric fields that facilitate the generation and the acceleration of electrons. These electrons then travel along what could be called quasi-ballistic trajectories in the said strong electric field (usually undergoing also an avalanche multiplication here) towards the surface of the emitting anode. At the same time however, they loose, on their way, an appreciable amount of energy through inelastic collisions (scattering). The present understanding is that large voltages are needed in order to obtain considerable emission of electrons through this method. If the applied electrical field E is to small (within ohmic range, mobile charge carriers' concentrations and electrical mobility are constant and independent of the electric field E) and the thickness of the semiconducting or insulating material $L_{sam}$ (FIG. 2) is larger than the mean free path of the mobile charge carriers (at best of the order of some one to two thousand Angstroms), then the electrical current component $I_{bal}$ is negligibly small, leading to essentially zero value of the electron emission current $I_{em}$ (FIG. 2).

Some selected prior art of class 1 are commented below, others are referred in the end of the paragraph.

U.S. Pat. No. 5,536,193 Relates to a method of fabricating a field emitter using the steps of; dispersing small pieces of wide band gap material on a substrate, cover it with a metal, etching the metal away until the wide band gap material comes forth, making small peaks for emitting electrons.

U.S. Pat. No. 5,463,275 Describes only electron emitting devises comprising a layered structure of at least three specialty chosen semiconductor materials U.S. Pat. No. 4,801,994 Relates to a three-layer semiconductor structure, where the middle layer is supposed to be an intrinsic semiconductor, which supposedly should conduct electrons with very low losses.

EP 504 603 B1 Consists of disposing a complex structure of semiconductors with special impurity levels such as to influence the different depletion regions. The description discloses the use of a Schottky barrier metal-semiconductor junction in order to improve emission efficiency.

U.S. Pat. No. 5,554,859, U.S. Pat. No. 4,303,930 and GB 1 303 659 cover areas similar to EP 504 603 B1

Other relevant references are: Metal-Insulator-Metal electron field emitters (Physical Review Letters Vol. 76, 17 (1996), 320), but also electron field emitters containing various forms of diamond-like components (U.S. Pat. No. 5,631, 196, U.S. Pat. No. 5,703,435 and the citations there-off).

Class 2

In some cases of the said prior art, the features characterising class one (combination of more or less planar metallic, semiconducting and insulating materials of various thickness) are combined with feature concerning the formation/concentration and shaping of the necessary electrical field. The emitting cathode in this case is usually prepared in order to facilitate electron field emission from a single point. This is obtained either through covering the material with a low electron work function at small local areas and/or shaping the material geometrically to create an emissive point or peak.

Some selected prior art of class 2 are commented below, others are referred in the end of the paragraph.

U.S. Pat. No. 5,229,682 Concerns a field electron emission device, in which electrons enter free space directly from a part of the emitting electrode pointing through an aperture in the opposite electrode and interjacent layer. The electrons are not traversing any interjacent semiconductor or insulator layer. The emitting electrode is shaped in order to have a part that peaks through the aperture in the opposite electrode and interjacent layer. A flat panel display is made by an array of such electrodes.

U.S. Pat. No. 5,712,490 Concerns a photocathode device, comprising several semiconductor layers disposed on a window layer, the semiconductor layers chosen; to optimise the ability to absorb photons, that is photoconductivity, to increase the diffusion length of those electrons. The invention does not disclose an optically transparent electrode to be disposed between the window layer and the first semiconductor layer (see $3^{rd}$ column, line 11)

U.S. Pat. No. 5,528,103 As U.S. Pat. No. 5,229,682, but also comprising focusing ridges, for the purpose of generating an electrical field causing the electrons emitted from the gate electrodes in between them, to converge into a narrow band, not for absorbing electrons. Moreover these electrodes/ridges have to be conductive (though otherwise stated in col. 7, line 27) in order to serve their purpose.

U.S. Pat. No. 5,212,426 As U.S. Pat. No. 5,229,682, but also comprising an integral control for each electrode (pixel) using built in transistors for controlling the supply of electric charge to each emitting electrode U.S. Pat. No. 4,823,004 Relates to a device for analysing the ballistic trajectories of electrons through a material, as well as gaining information about the material bulk structure by analysing the ballistic trajectories.

U.S. Pat. No. 5,444,328 Relates to a method for building up high voltage electron emitting semiconductor structures in a way which makes electrically breakdown less probable.

U.S. Pat. No. 5,631,196 As U.S. Pat. No. 5,229,682, but with the emitting electrode being flat, the parts peaking through the aperture in the opposite electrode and interjacent layer being replaced by impurity doped diamond parts as the electron emitting substance.

Other relevant references are: U.S. Pat. No. 4,683,399, EP 150 885 B1, EP 601 637 A1, U.S. Pat. No. 5,340,997 and the citations there off).

Exceptions

Exceptions from above classes include devices in which electrons are emitted into the empty space between a cathode and the anode by applying sufficient electrical voltage between them. The emitting cathode in this case is usually either covered by a material with a low electron work function and/or it is geometrically shaped in order to facilitate electron field emission. An example of such a device is:

U.S. Pat. No. 5,703,435 Concerns a field emission cathode in which the material of the electron-emitting layer comprises either a mixture of graphite and diamond crystallites or amorphic diamond.

Applications

In order to utilise electron transmitting semiconductors and electron sources in applicable devices, several extensions have to be made to the basic components described in the prior art.

The emitted electrons might not have the sufficient energy to serve their purpose and have to be further accelerated. This will typically be carried out by having an "accelerating electrode" at some distance from the emitting surface at a high positive electrical potential thereby accelerating the emitted electrons to higher energies in the interjacent empty space.

For the electron-light conversion purposes, the appropriate "luminophor" materials can be incorporated within the anode structure, the said anode structure being either an integral part of the cathode-anode structure or part of the "accelerating electrode" separated from the cathode-anode structure by a finite empty space.

The applications of electron source devices typically include all forms of electron microscopy, Planar electron beams lithography, electron guns for evaporation of materials, x-ray tubes, electron multipliers (photomultipliers, two-dimensional particle/EM radiation detector arrays), electron beam welding machines, Flat Panel Displays (based on electron field emission), and some fast ballistic semiconductor components and devices.

Lithography Prior Art

A single very important application of the present invention is in the field of Lithography (Microlithography) and more specifically in the field of what has been termed in the literature as Planar Electron Beam Lithography (PEBL). Lithographic steps are essential during the process of Integrated Circuit (IC) production. The lithographic part of IC production consists in principle in repetition of the steps of resist deposition onto the surface of a wafer, of the exposing parts of the resist with radiation (photons, electrons or ions) by a "writing tool", and finally of resist removal. Optical, x-ray and Electron/Ion Beam Lithographs are the known methods that can, at least in principle, accomplish the necessary lithographic tasks during the IC production. The optical lithography is the standard, well-matured industrial technology; its major drawback is the optical diffraction limit on the smallest features that can be printed. In the further strife for decreasing the size of the IC components and ICs in general, this has to be considered as a major drawback. By using electrons as radiation source, the optical diffraction limit is not present. The schematic diagram of the principle behind the Planar Electron Beam Lithography, used in the prior art, is shown in FIG. 8. It uses a basic structure consisting of cathode 1, a thin dielectric film 24, an electron absorbing template 19 and the anode 4. Electrons quantum tunnel through thin dielectric film 24 and emerge into free space FS through the surface S4 only at places, where the anode is in direct contact with the dielectric film. These electrons are then accelerated and projected onto the wafer with pre-deposited electron sensitive resist layer 6. In H. Ahmed et al (incl. some of the inventors of the present invention) "Proceedings of the Conference on Microlithography"; Cavendish Laboratory, Cambridge 1989, it is shown and demonstrated experimentally how to carry out Planar Electron Beam Lithography in practice. In this prior art, the electron lithographic projection system has been demonstrated using a prior art planar electron emitter. However, the accessible electron emitters suffer from other drawbacks: Planar electron emitters suitable for this purpose can expose entire wafers with one broad beam, but, at the necessary voltages, these planar electron emitters have extremely short lifetimes due to the effects caused by the necessary large fields and short distances.

The present invention offers a solution to this problem.

It is a disadvantage of the existing field emission planar electron devices, that large external voltages have to be applied over relatively very short distances (of the order of the electron mean free path) in order to generate sufficiently strong electric fields that facilitate the generation and the acceleration of electrons.

It is another disadvantage that this requirement of relatively very high local electrical fields over relatively very short distances, together with the quality of the material at hand, lead in its consequence, to shorter electron mean free path (larger scattering rates) that in turn effectively sets the limit on possible physical distances within the said devices that electrons can move through without too appreciable energy losses.

It is a further disadvantage that, due to the above mentioned effects, either only a small portion of these electrons have sufficient energy to escape through the (emitting) surface of the anode into a space next to the cathode-anode structure.

It is a still further disadvantage that these devices in general have quite low electron emission currents $I_{em}$ (FIG. 2) and high background current $I_{back}$ (FIG. 2), It is a still further disadvantage of the existing field emission planar electron devices, that they suffer from shortcomings such as too large electrical power consumption per square centimeter of electron emitting surface, It is a still further disadvantage that the above mentioned effects results in low electron emission efficiency.

It is a still further disadvantage of the existing field emission planar electron devices that they are often unstable and liable to dielectric breakdown that generally seriously limits their lifetime.

It is a still further disadvantage of said devices that they suffer from frequently overheating due to large energy losses in the critical areas of the said devices (high electric fields over very short distances).

It is a still further disadvantage that scaling-up of these planar electron field emission devices (increasing the electron emitting area of the cathode) poses a severe problem.

It is a still further disadvantage of said devices that they use non-standard expensive materials.

It is a still further disadvantage of the existing field emission planar electron devices, that the constructions are too complex.

It is a still further disadvantage of the planar electron emitters emitting a broad beam suitable for the exposure of wafers in the fabrication of IC's, that they have an extremely short lifetime (less than 30 minutes), which makes them unsuitable for Planar Electron Beam Lithography.

Electron Transmitting Semiconductors

The present invention aims at solving the above mentioned disadvantages by using the existence, under proper operating conditions and in certain simple semiconductor and insulator structures, of quasi-ballistic electrons.

It is an object of the present invention to make available a semiconductor or insulator substrate in which electrons move along quasi-ballistic trajectories when said substrate is subjected to low applied external electric fields ($\leq 100$ V/cm). The electrons (quasi-ballistic electrons) move along these trajectories from one side of the substrate (surface S2, FIG. 3) to the other side (surface S4), and are accelerated to energies sufficient to escape into vacuum through the electron emitting surface S4. (From now on said substrate is also referred to as Quasi-ballistic semiconductor substrate—"QB-Sem substrate").

It is another object of the present invention to make available a QB-Sem substrate in which the quasi-ballistic electrons suffer almost no energy losses and momentum changes while moving through the QB-Sem substrate.

It is a further object of the present invention to make available a QB-Sem substrate in which no heat is generated when the substrate is used for quasi-ballistic transport of quasi-ballistic electrons.

It is a still further object of the present invention to make available a QB-Sem substrate in which quasi-ballistic transport is possible at low (ohmic) electrical fields and can take place over macroscopic distances.

It is a still further object of the present invention to make available a QB-Sem substrate in which electron velocities are not limited by high electrical field mobility saturation effects.

It is a still further object of the present invention to make available a QB-Sem substrate in which the electron behaviour is similar to the behaviour of electrons in vacuum tubes.

It is a still further object of the present invention to make available a QB-Sem substrate, which do not require high electrical fields and extremely small substrate thickness (of the order of one hundred Angstroms).

It is a still further object of the present invention to make available a QB-Sem substrate from which simple design, robust, relatively cheap, high reliability and long lifetime semiconductor components can be produced.

It is a still further object of the present invention to make available a QB-Sem substrate to be used in the field of electron-optical applications.

It is a still further object of the present invention to make available a QB-Sem substrate to be used in the design and production of semiconductor components and devices and Integrated Circuits (ICs).

It is a still further object of the present invention to make available a QB-Sem substrate in which the anomalously low power dissipation by QB-electrons within the QB-semiconductor contributes to the solution of the heat generation problem when high packing densities of components in the ICs are used.

It is a still further object of the present invention to make available a QB-Sem substrate so that the design of "Hot Electron" devices does not have to rely on thin film complicated multistructures that are often unreliable and costly to produce.

It is a still further object of the present invention to make available a QB-Sem substrate, which do not require high electrical fields, so that the degradation of the various semiconductor devices through irreversible dielectric breakdown is essentially eliminated.

It is a still further object of the present invention to provide QB-Sem substrates, which are fully integrable with the existing Semiconductor Technology.

It is a still further object of the present invention to provide QB-Sem substrates, which are fully integrable with the existing Integrated Circuit Technology and Production.

It is a still further object of the present invention to provide QB-Sem substrates from which the design of fast high frequency semiconductor components and devices are under no geometrical constraints.

It is a still further object of the present invention to provide QB-Sem substrates with which new design concepts for semiconductor components/devices and/or physical apparatuses are possible.

It is a still further object of the present invention to provide QB-Sem substrates with life times of the same order of magnitude (or longer than) as the usual Semiconductor Industry products.

The effect that, in QB-semiconductors, electrons that can move quasi-ballistically over macroscopic distances at low applied electrical fields, as disclosed by the present invention, will have a major impact on design and construction/manufacture of many semiconductor components and devices of both bipolar and unipolar variety. These will be used either as single units or as components/parts within Integrated Circuits' architecture.

Electron Sources

It is an object of the present invention to provide electron emitters in which the emitted electrons use macroscopic quasi-ballistic trajectories (these trajectories are many hundreds of microns long) in a piece of QB-Sem substrate subject to low externally applied electrical fields ($\leq 100$ V/cm). These electrons (quasi-ballistic electrons), moving along these trajectories from one side of the substrate (surface S2, FIG. 3) to the other (surface S4) are accelerated, increasing thereby their energy, and escape into vacuum through the electron emitting surface S4.

It is another object of the present invention to provide planar electron emitters, which are characterised by very low applied electric fields/voltages.

It is a further object of the present invention to provide planar electron emitters, which are characterised by very low power dissipation.

It is a still further object of the present invention to provide thin ($\leq 1$ cm) planar electron emitters with all solid state construction.

It is a still further object of the present invention to provide planar electron emitters in which the macroscopic emitting surface has no subdivisions.

It is a still further object of the present invention to provide planar electron emitters characterised by the simplicity and robustness of the assembly (FIG. 3).

It is a still further object of the present invention to provide planar electron emitters characterised by the self supporting structure of the assembly.

It is a still further object of the present invention to provide planar electron emitters in which there are no limits to geometrical scaling-up of electron emitting surface.

It is a still further object of the present invention to provide planar electron emitters in which the electron emission area is large and only limited by the lateral size of the QB-semiconductor wafer, which is today some 800 cm2 (this limit can be of course be overcome by building modules).

It is a still further object of the present invention to provide electron emitters suitable for Planar Electron Beam Lithography The number of technological applications of the planar quasi-ballistic electron emitter is very large and it is the intention of the authors of the present invention to claim also the use of the present invention in these. These applications include methods and apparatuses/products such as Planar electron beam lithography, Field emission Flat Panel Displays, High speed (low-dissipation) signal transmission devices, High efficiency detectors, efficient Light sources, Electron emission microscopy, Two-dimensional electromagnetic radiation and/or particle detector arrays, High speed, easily integrable semiconductor components, Semiconducting devices using ballistic electrons, variety of (novel) electron sources and many others.

SUMMARY OF THE INVENTION

The above mentioned objects are complied with by providing, in a first aspect, an article comprising an element having a first and a second surface, wherein
the first surface is adapted to hold a first electrical charge, and wherein the second surface is adapted to hold a second electrical charge, the first surface being substantially parallel to the second surface, and wherein
the element comprises a material or a material system being prepared so as to reduce electron scattering within the material or material system, and having a predetermined crystal orientation perpendicular to the first or second surface,
means for providing an electric field across at least part of the element, said means comprising
means for providing the first electrical charge to the first surface of the element, and
means for providing the second electrical charge to the second surface of the element, the second electrical charge being different from the first electrical charge in order to move electrons in a direction substantially perpendicular to the first or the second surface.

In a second aspect, the present invention relates to an article comprising
an element having a first and a second surface area, wherein
the first surface area is adapted to hold a first electrical charge, and wherein the second surface area is adapted to hold a second electrical charge, and wherein
the element comprises a material or a material system being prepared so as to reduce electron scattering within the material or material system, and having a predetermined crystal orientation perpendicular to the first or second surface,
means for providing an electric field across at least part of the element, said means comprising
means for providing the first electrical charge to the first surface area of the element, and
means for providing the second electrical charge to the second surface area of the element, the second electrical charge being different from the first electrical charge in order to move electrons between the first surface area and the second surface area.

The material or material system according to the first and second aspects may comprise a semiconductor, such as silicon, germanium, silicon carbide, gallium arsenide, indium phosphide, indium antimonide, indium arsenide, aluminium arsenide, zinc telluride or silicon nitride or any combination thereof.

In order to reduce electron scattering, and thereby facilitate the presence of quasi-ballistic electrons, the material or material system may be doped with one or more of the following dopants: phosphorus, lithium, antimony, arsenic, boron, aluminium, tantalum, gallium, indium, bismuth, silicon, germanium, sulphur, tin, tellurium, selenium, carbon, beryllium, magnesium, zinc or cadmium. The predetermined doping level may be less than $1\times10^{18}$ cm$^{-3}$, such as less than $1\times10^{16}$ cm$^{-3}$, such as less than $1\times10^{14}$ cm$^{-3}$, such as less than $1\times10^{13}$ cm$^{-3}$, such as less than $1\times10^{12}$ cm$^{-3}$.

The means for providing the first electrical charge to the first surface may comprise an at least partly conductive first material or material system. In a similar way, the means for providing the second electrical charge to the second surface may comprise an at least partly conductive second material or material system.

The at least partly conductive first and second material or material system may constitute thin layers each having a first and a second surface. The layers may comprise one or more of the following materials: gold, chromium, platinum, aluminium, copper, caesium, rubidium, strontium, indium, praseodymium, samarium, ytterbium, francium or europium or any combination thereof.

In order to provide energy to the system the second surface of the first layer may be operationally connected to a first terminal of a charge reservoir, whereas the first surface may be in direct contact with the first surface of the material or material system of the element. Similarly, the first surface of the second layer may be operationally connected to a second terminal of the charge reservoir, whereas the second surface is in direct contact with the second surface of the material or material system of the element.

The charge reservoir may comprise a battery or any other electrical energy source capable of providing a direct or alternating current to the article.

The first and second layer may comprise a metal or a highly doped semiconductor material with a doping level higher than $1\times10^{17}$ cm$^{-3}$.

In a third aspect, the present invention relates to a method for providing a first type of electrons, said method comprising the steps of:

providing an element having a first and a second surface, wherein
the first surface is adapted to hold a first electrical charge, and wherein the second surface is adapted to hold a second electrical charge, the first surface being substantially parallel to the second surface, and wherein the element comprises a material or a material system being prepared so as to reduce electron scattering within the material or material system, and having a predetermined crystal orientation perpendicular to the first or second surface, providing means for providing the first electrical charge to the first surface of the element, and providing means for providing the second electrical charge to the second surface of the element, the second electrical charge being different from the first electrical charge so as to move a second type of electrons in a direction substantially perpendicular to the first or second surface.

In the present context, the first type of electrons may comprise electrons traversing the element with normal losses, whereas the second type of electrons may comprise quasi-ballistic electrons.

The material or material system forming at least part of the element may comprise semiconductor materials. A list of suitable materials or combinations thereof have been mentioned in relation to the first and second aspects of the present invention. Similarly, the preparation may comprise doping using the above-mentioned dopants and doping levels in order to reduce scattering of quasi-ballistic electrons.

In order to move quasi-ballistic electrons a potential difference larger than 2 volts may be applied between the first and second surface of the element. Suitable materials or material systems for providing the first and second charges to the element may comprise a metal or a highly doped semiconductor material with a doping level higher than $1 \times 10^{17}$ cm$^{-3}$. Examples of such materials are: gold, chromium, platinum, aluminium, copper, caesium, rubidium, strontium, indium, praseodymium, samarium, ytterbium, francium or europium or any combination thereof.

In a fourth aspect, the present invention relates to a method for fabricating an article, said method comprising the steps of:

providing a semiconductor material or material system having a first and a second surface, the second surface being substantially parallel to the first surface, the semiconductor material or material system having a predetermined crystal orientation perpendicular to the first or second surface, providing a surface treatment to the first and second surfaces so as to reduce surface roughness, doping the semiconductor material or material system with a dopant so as to obtain a predetermined doping level so as to reduce electron scattering within the material or material system, providing an at least partly conductive first material or material system, said first material or material system forming a layer having a first and a second surface, wherein the second surface is operationally connected to a first terminal of a charge reservoir and wherein the first surface is in direct contact with the first surface of the material or material system of the element, and providing an at least partly conductive second material or material system, said second material or material system forming a layer having a first and a second surface, wherein the first surface is operationally connected to a second terminal of the charge reservoir and wherein the second surface is in direct contact with the second surface of the material or material system of the element.

Regarding the above-mentioned materials or material systems a list of suitable candidates or combinations thereof have been mentioned in relation to the first and second aspects of the present invention. Similarly, the preparation may comprise doping using the above-mentioned dopants and doping levels in order to reduce scattering of quasi-ballistic electrons.

The predetermined crystal orientation may comprise the <111>, <110> or <100> direction, or any other crystal orientation appropriate for the crystal structure of the element. The surface treatment may comprise different kinds of techniques such as etching and/or polishing. Polishing may comprise optical and/or mechanical polishing.

Regarding dopants, these may be selected from the group consisting of lithium, phosphor, antimony, arsenic, boron, aluminium, tantalum, gallium or indium or any combination thereof. The doping level may be less than $1 \times 10^{18}$ cm$^{-3}$, such as less than $1 \times 10^{16}$ cm$^{-3}$, such as less than $1 \times 10^{14}$ cm$^{-3}$, such as less than $1 \times 10^{13}$ cm$^{-3}$, such as less than $1 \times 10^{12}$ cm$^{-3}$.

The at least partly conductive first and second material or material system may comprise a metal or a highly doped semiconductor material with a doping level larger than $1 \times 10^{17}$ cm$^{-3}$. Suitably materials may comprise gold, platinum, chromium, aluminium or copper or any combination thereof.

In a fifth aspect the present invention relates to a flat panel display comprising an article according to the first aspect of the present invention, the article further comprising a layer of material being adapted to emit light at a plurality of wavelengths upon exposure of electrons, said material layer defining, in a plane substantially parallel to the first and second surface of the element, a two-dimensional matrix having one or more surface elements, each surface element being adapted to emit light at a predetermined wavelength, and means for selectively proving electrons to the one or more surface elements in the two-dimensional matrix.

The material layer for emitting the plurality of wavelengths may comprise an appropriate luminophors or standard colour television phosphors. The material layer may be held by the first or second surface of the element. Alternatively, the material layer may be held by an additional element.

In order to obtain full colour information the emitted light may comprise at least three wavelengths corresponding to at least three colours. By combining these three colours it should be possible to deduce any colour in the visible range. The emitted wavelengths may correspond to colours red, yellow and blue, or to colours red, green and blue.

The selective means may comprise a pattern so as to define, in a plane substantially parallel to the first or second surface, a two-dimensional matrix of electrically controllable matrix elements, said pattern being formed by the at least partly conductive material or material system.

In a sixth aspect, the present invention relates to a method for exposing a film, such as a resist, to a plurality of electrons of a first type, said method comprising the steps of:

providing a first element having a first and a second surface, wherein the first surface is adapted to hold a first electrical charge, and wherein the second surface is adapted to hold a second electrical charge, and wherein the element comprises a material or a material system being prepared so as to reduce electron scattering within the material or material system, and having a predetermined crystal orientation perpendicular to the first or second surface, providing a second element, said second element being adapted to hold the film to be exposed to the plurality of electrons of the first type, providing a patterned absorption layer, said absorption layer being adapted to absorb electrons transmitted through the first element at positions determined by the pattern, providing the first electrical charge to the first surface of the first element, and providing the second electrical charge to the second surface of the first element, the second electrical charge being of opposite sign compared to the first electrical charge so as to move a second type of electrons from the first surface towards the second surface, and providing a third electrical charge to the second element, said third electrical charge having the same sign as the second electrical charge.

Regarding the above-mentioned materials or material systems a list of suitable candidates or combinations thereof have been mentioned in relation to the first and second aspects of the present invention. Similarly, the preparation may comprise doping using the above-mentioned dopants and doping levels in order to reduce scattering of quasi-ballistic electrons.

The first and second electrical charges are provided to the first and second surfaces of the first element from a first and second terminal of a charge reservoir, respectively, wherein the potential difference between the first and second terminals of the charge reservoir is larger than 2 volts. The third electrical charge is provided to the second element from a third terminal of the charge reservoir.

The second element may comprise a metal or a semiconductor material, such as silicon, germanium, silicon carbide, gallium arsenide, indium phosphide, indium antimonide, indium arsenide, aluminium arsenide, zinc telluride or silicon nitride or any combination thereof.

Finally the first type of electrons may comprise electrons traversing the element with normal losses, whereas the second type of electrons may comprise quasi-ballistic electrons.

DETAILED DESCRIPTION OF THE DRAWINGS

Description of the Present Invention, Theoretical

The present invention will first be described theoretically using the embodiment of a Planar Electron Emitter (PEE) with reference to FIG. 1 and FIG. 2. Also, for the sake of clarity, without loosing the validity and generality of the arguments to follow, a simplified model will be used that also uses a specific set of electrodes. Under no circumstances this should be construed as limiting factor of the present invention The specific configuration in FIG. 1 and FIG. 2 is used purely for illustration purposes and other much more general and/or different configurations are possible and must be considered as covered by the present invention.

Figure 1:
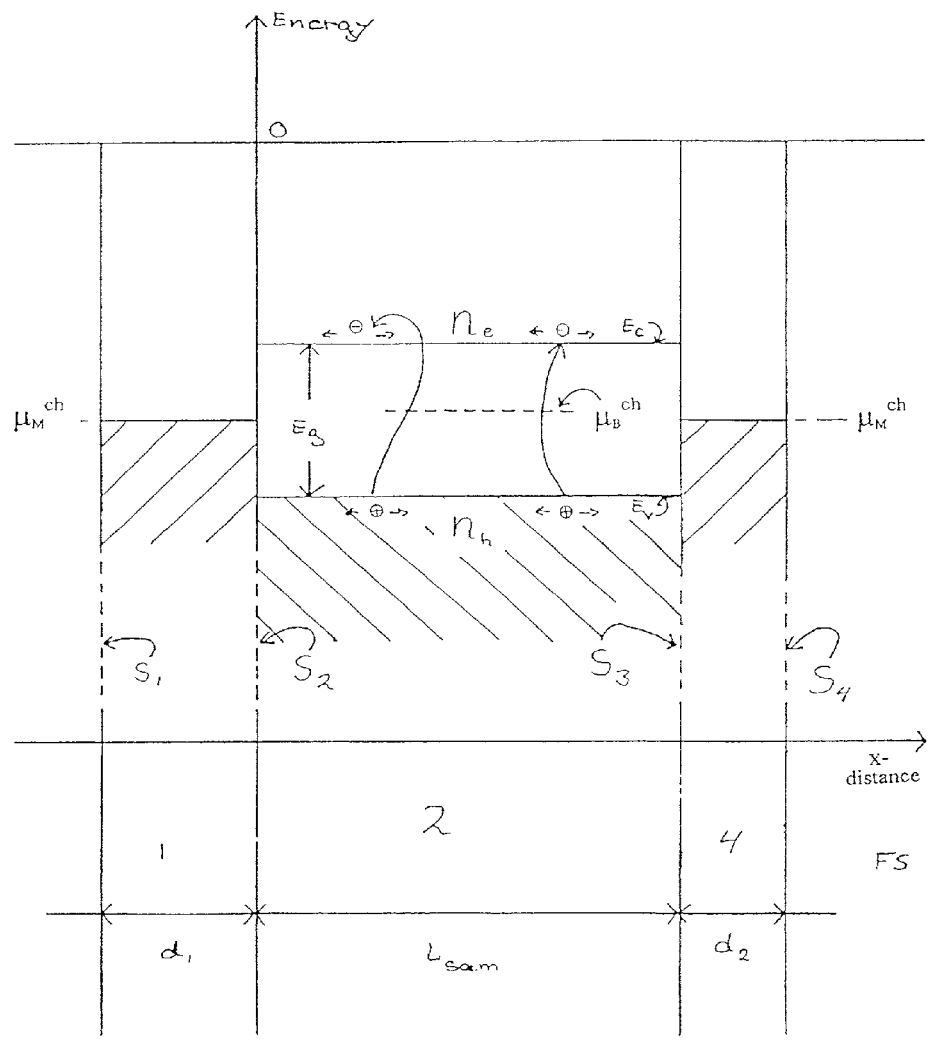
FIG. 1 is a schematic and simplified electron energy band diagram according to present invention, when the applied external potential is zero.
Figure 2:
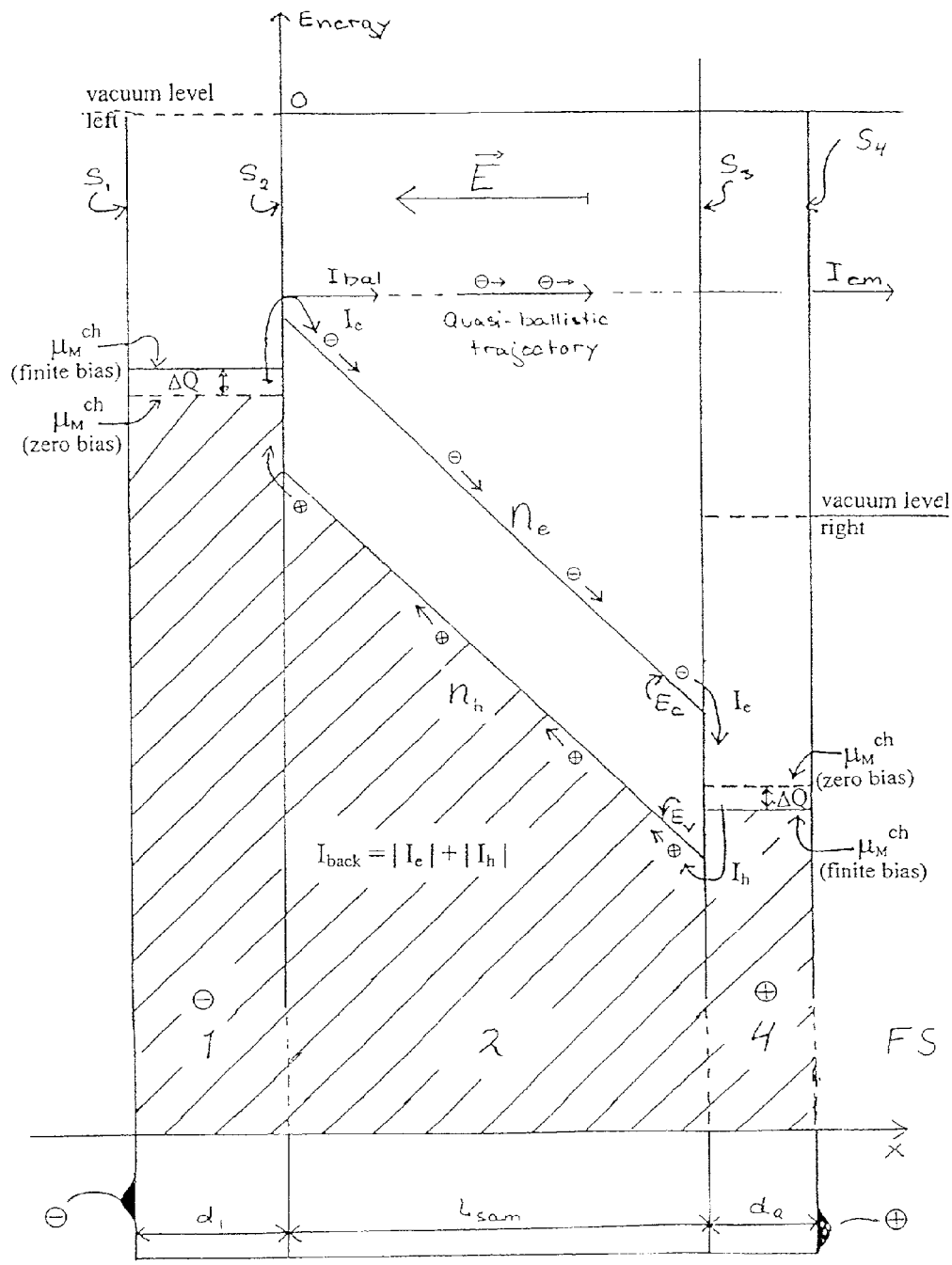
FIG. 2 is schematic and simplified electron energy band diagram according to present invention, when a finite external potential is applied.

In FIG. 1, a simple electron band structure as a function of spatial co-ordinate of a piece of semiconductor or insulator material is shown, where two, for the electrical transport most relevant, quantum mechanical energies $E_v$ (top of the valence band) and $E_c$ (bottom of the conduction band) are marked. The two energies $E_c$ and $E_v$ are separated by a band gap $E_g$. A set of two metal electrodes, 1 (cathode) and 4 (anode) are deposited on the two respective surfaces S2 and S3 of the said piece of semiconductor or insulator material. For the sake of simplicity these two electrodes are assumed to be identical.

At zero degrees Kelvin all quantum mechanical electron states above $E_c$ and above chemical potential ($\mu_M^{ch}$) of the metal electrodes are empty, while those below $E_v$ and below chemical potential ($\mu_M{}^{ch}$) of the metal electrodes are occupied. At some finite temperature, e.g. 300 degree Kelvin and in thermodynamical equilibrium, the chemical potential within the bulk of the said piece of semiconducting or insulating material ($\mu_B{}^{ch}$) is assumed to lie somewhere near the middle of the gap. For the sake of simplicity it is assumed that this chemical potential coincides (in energy) with the chemical potential of the metal electrodes, forming in this way what is known as a neutral electrical contact. At this finite temperature there will be a small but finite concentration $n_e$ of mobile electrons at energy $E_c$ and small but finite concentration $n_h$ of mobile holes at $E_v$. It is assumed furthermore that the semi-classical approximation is valid which means that there are no changes in the electron band structure locally when external electrical field E is applied. The effect of this field is accounted for by appropriate spatially dependent energy shift of all quantum mechanical energies at a given distance x due to the presence of the classical electrical potential $$V(x)=Ex. \qquad (1)$$

FIG. 1 then describes in its totality the situation at finite temperature when no external electrical field is applied.

The situation described in FIG. 1 will change to situation described in FIG. 2, when a finite, negative electrical charge $\Delta Q$ is added to metal electrode 1 and corresponding negative electrical charge $\Delta Q$ is removed from metal electrode 2. These extra charges on the two said electrodes will cause a constant electrical field E to be present within the said piece of semiconducting or insulating material.

Under low, ohmic electrical field E (~100 V/cm; see also FIG. 2), the mobility and the concentrations of thermal electrons $n_e$ and holes $n_h$ (FIG. 2) will stay essentially constant, while their drift velocities will change accordingly $$V\text{-drift(electrons; holes)}=\text{mobility(electrons; holes)}E, \qquad (2)$$

increasing in this way the respective currents $I_e$ and $I_h$ (FIG. 2) with increasing applied electrical filed E. The component $I_{bal}$ (FIG. 2) is the contribution to the total electrical current running through the structure shown in FIG. 2 from quasi-ballistic electrons, that is those electrons, injected into said piece of semiconducting or insulating material from the metal electrode 1, that essentially do not suffer any inelastic energy losses nor any appreciable momentum changes while moving through the said piece of semiconducting or insulating material towards the metal electrode 2 along the electron quasi-ballistic trajectory shown in FIG. 2. The electrical current component $I_{em}$ is due to those electrons (quasi-ballistic electrons) which, after traversing from the metal electrode 1, through the said piece of semiconducting or insulating material and into the metal electrode 2, have still sufficient energy (energy larger than the energy barrier of the emitting surface S4—Free Space interface) and finite, sufficiently large velocity component in x-direction in order to escape from the structure, composed of the metal electrode 1 plus the said piece of semiconducting or insulating material plus metal electrode 2, into free space (FS in FIG. 2) through electron emitting surface S4 (FIG. 2).

QB-Sem

The preparation of the individual regions of the quasi-ballistic electron transmitter/emitter are now described In reference to FIG. 3 now the preparation of a high resistive semiconductor or insulator will be described. The quasi-ballistic semiconductor (QB-Sem) in this case was the said single crystal silicon sample, cut out from a single crystal Si ingot, prepared by a Float Zone crystal growth method. Thin slices (wafers) were prepared from this ingot, with <111> orientation perpendicular to the wafer surface. However, other lattice orientations <110> and <100> can also be chosen with similar results. If a material crystal other than Silicon is used, lattice orientations appropriate for such material crystal should be chosen. Both surfaces S2 and S3 were optically polished. The Phosphorus doping level (giving n-type conductivity) was chosen to be $2.0 \times 10^{12}$ cm-3. A Schottky contact (a cathode) was prepared by a successive evaporation of 50 Å of Chromium onto the surface S2 followed by evaporation of 2000 Å of Gold. The anode was ohmic, consisting of high Phosphor concentration, degenerate silicon layer (a thin region appr ~1 microns thick, below the surface S3—see FIG. 3) and a thin 150 Å thick evaporated Gold film.

The Region 2—Quasi-Ballistic Semiconductor

The choice of the quasi-ballistic semiconductor is not limited to one particular material, but can be prepared in a number of different ways, using different materials. The only requirements are the existence of a finite band gap $E_g$ (see FIG. 1) and the existence of quasi-ballistic trajectories for electrons between the two opposite surfaces of the material. In the preferred embodiment the said material (QB-Sem) is silicon, but group III-V compound semiconductors (such as GaAs) and group II-VI compound semiconductors are also equally good candidates. Crystallographic orientation, shallow and deep impurities doping levels and the temperature of operation of the finished device are the important parameters to consider when choosing a suitable quasi-ballistic semiconductor.

Also well suited as Quasi-ballistic semiconductor (at least in principle) are insulators such as $SiO_2$, $Al_2O_3$, Silicon carbide, silicon nitride, diamond (or diamond-like Carbon particles) and others Some of the materials have been and/or are being investigated in connection with their use as field emission electron sources already (see prior art).

Region 1 and Surfaces S1 and S2—Cathode Region

Figure 3:
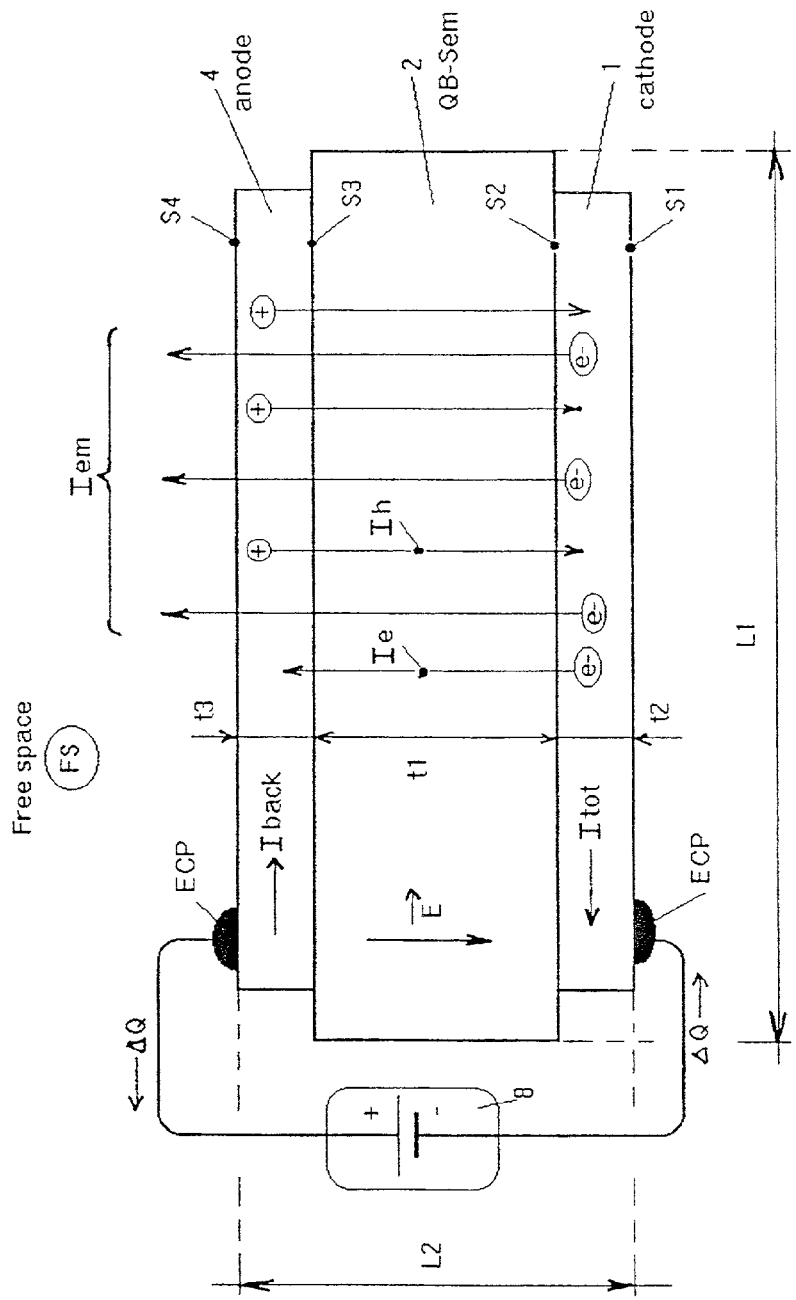
FIG. 3 is a simplified model of the basic structure of a planar electron emitter according to the present invention.

In the preferred embodiment depicted in FIG. 3, the cathode region has been formed by evaporation of Chromium and Gold metal films onto the surface S2 of the silicon sample, forming in this way a rectifying Schottky contact. The sole purpose of the cathode region though is to maintain various amount of negative charge $\Delta Q$ on the surface S2 and this can be done in a number of different ways.

In one such alternative, the region 1 is just a gaseous phase of partially ionised gas such as Argon and/or Nitrogen. No metal electrode is required in this case at all.

To achieve the optimal performance of the cathode as an electron injector of electrons into the QB-semiconductor region (2 in FIG. 3), it is desired that the said extra negative charge $\Delta Q$ from the battery (see FIG. 3) moves the chemical potential $\mu_M{}^{ch}$ (see FIG. 2) as much as possible (increase of the electron injection into QB-Sem). This can be achieved by decreasing the interface electron density of states through mechanical, chemical and/or thermal treatment of the surface S2. If the metal cathode electrode is either required or desired, this treatment of the surface S2 is done prior metal material deposition. Alternatively, one can choose a metallic material with low electron density of states at the Fermi level and/or low electron work function.

Region 4 and Surfaces S3 and S4—Anode Region

As described above, a thin region of silicon sample, next to the surface S3, has been implanted with high dose of Phosphorus, becoming in this way degenerate. A thin Gold film has been then deposited on the said surface S3 which has been optically polished prior this Gold film deposition, the whole structure forming in this way an ohmic contact to the silicon sample. This preparation of the anode region might not lead to the most optimal performance of the said Planar Electron Emitter PEE.

As with the cathode region, the sole purpose of the anode region is to secure that a various amount of negative charge ΔQ can be removed from the surface S3 region. Here though, the requirements concerning the optimal functioning of the said (anode) region are different from those valid for the cathode region. The hole current $I_h$ (see FIG. 2) should be minimised (current $I_h$ increases as the interface chemical potential $\mu_M^{ch}$ moves downwards in energy—see FIG. 2) as well as the thickness of the anode metal electrode (relatively large energy losses of the quasi-ballistic electrons when moving through region 4). To achieve the first of these goals one needs either a metal with very high electron density of states at the Fermi level and/or very high electron density of states within the surface S3—region 4 interface. As with the preparation of the surface S2, also here this can be achieved with the proper mechanical, chemical and/or thermal treatment of the said surface S3 prior metal deposition.

In order to achieve the second goal, yet another alternative can be chosen. In this case the surface S3 is free of the metal electrode (region 4 in FIG. 3) and an extra electrode (electron acceleration electrode 7—see FIG. 8 for example) is placed within the free space FS (FIG. 3) and in closed vicinity of the surface S3. This extra electrode is biased at relatively high positive potential with the respect to surface S3 and/or the cathode region 1, polarising in this way the whole assembly. If the developed electric field within the region 2 is not sufficient for the acceleration of the quasi-ballistic electrons within the region 2 to energies required in order for these electrons to escape through the said surface S3 into free space FS, the surface S3 can be geometrically shaped in such a way as to increase the said electric field locally at points (and/or sharply curved regions) of the surface S3, spatially closest to the electron acceleration electrode 7 in FIG. 8.

Figure 8:
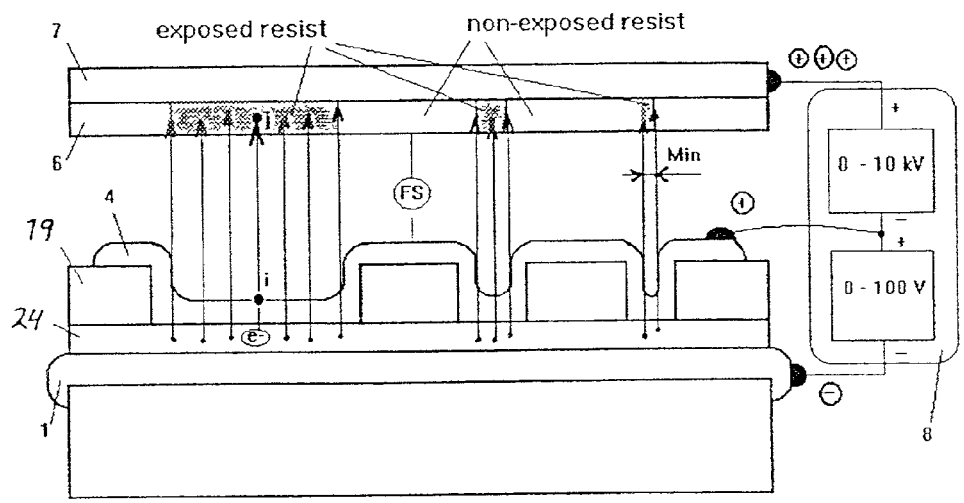
FIG. 8 is a schematic side view of a prior art planar electron emitter for Planar Electron Beam Lithography. A template of electron absorbing material is placed between the QB-Semiconductor and the anode. An electron acceleration electrode is added, and the substrate to be exposed is placed before this electron acceleration electrode.

Finally, the geometrically shaped surface S3 can be covered by a thin metal electrode (serving as a anode), the whole Planar Electron Emitter assembly (inclusive the electron acceleration electrode 7) looking similar to an arrangement shown in FIG. 8. In such an arrangement the electrical discharging/charging up effects on the geometrically shaped surface S3 are minimised.

The important point to stress here is that the shape of the electron emitting surface S3 (surface S4 if metal electrode 4 is present) does not have to be strictly planar.

Performances of QB-Sem

The sample was placed in the vacuum and at external voltage of some 4.0 Volts (forward bias) between the cathode and the anode (at four volts across 0.5 millimeter—the thickness of silicon sample, the electric filed of 80.0 Volts/cm was created within the bulk of the silicon sample) a finite, relatively large and laterally homogeneous electron emission current $I_{em}$ was observed. The magnitude of the emission current $I_{em}$ indicated that as much as some 30% of all electrons, injected into the silicon sample from the cathode, reached the anode with energies of some 4 eV (electron affinity in silicon is 4.0 eV) above the energy $E_c$ (see FIG. 2), sufficient in order for these electrons to surmount the energy barrier of the anode surface S4—vacuum interface and to escape into the free space FS (see FIG. 3).

Description of the Present Invention, Practical

The present invention will first be described practically using the embodiment of a Planar Electron Emitter (PEE) with reference to FIG. 3 which is a schematic diagram illustrating one of possible physical forms of the preferred embodiment according to present invention.

The region 1 (a cathode) is connected both to region 2 (a piece of quasi-ballistic semiconductor) via surface S2 and to a negative pole of an external electrical charge/voltage supply 8 (battery) via electrical contact pads (ECP). Its role (cathode), together with the battery, is to supply and to maintain the negative electrical charge ΔQ (electrons) on the surface S2. At the same time, the same negative electrical charge ΔQ is removed from the region 4 (anode). The anode is connected to region 2 via surface S3 and to a positive pole of the external charge/voltage power supply 8 via ECP, the said power supply 8 maintaining the surface S3 positively charged. In this way a uniform electrical field E is established between the surfaces S2 and S3, causing a finite electrical current $I_{tot}$ to flow through the region 2. In reference to FIG. 2 now, this electrical current $I_{tot}$ is composed of three components $I_e$, $I_h$ and $I_{em}$. While the first two components form the background electrical current $I_{back}$, the component $I_{em}$ is formed by that portion of the electrons (from now on termed as quasi-ballistic electrons) that physically leave the device and enter the free space FS (FIG. 3) if a sufficiently high electrical field E and the corresponding electrical potential difference (V=E.t1 is maintained between the surfaces S2 and S3.

When a piece of semiconducting or insulating material (region 2—from now on termed as QB-Sem) is properly prepared, the surfaces S2 and S3 are properly treated and the regions 1 and 2 are properly chosen and constructed, the part of the electrical current $I_{em}$ (electron emission current) can become quite large in relation to the background current $I_{back}$.

When QB semiconductor is properly chosen and prepared, then even without any efforts for optimisation (inclusive the optimisation of the surfaces S2 and S3), $I_{em}$ of hundreds of nano-Amperes per square centimeter can be measured at electrical fields of the order of some 100 Volts/cm (from now on termed as ohmic electric fields), with the total thickness of the device L2 being macroscopic (less than millimeters). With the length scale L1 (square root of the area of the device) being of the order of 30 cm (today's size of silicon wafers for example), the device depicted in FIG. 3 is a large area planar electron emitter that is very simple to manufacture and can be produced at a very competitive price, even when compared with the standard Cathode Ray Tube (CRT) TV screens.

In the preferred embodiment depicted in FIG. 3, a sufficient injection of electrons from the cathode into the silicon sample ("Injection of electrical charge"—see FIG. 2) has been achieved electrically, by supplying the metal electrode 1 (cathode) with extra amount of negative charge ΔQ from the battery. However, since the electron injection from the cathode region into QB-semiconductor is also strongly temperature dependent, an alternative embodiment of the Planar Electron Emitter according to the present invention can involve a heated cathode structure (region 1—see FIG. 3). In yet another alternative embodiment, the electrons are injected into the QB-semiconductor by photo-illumination of the cathode-injecting surface S2 region (in some cases this region can include part of the QB-semiconductor next to the surface S2) through the surface S1. This embodiment of the said Planar Electron Emitter PEE according to the present invention is particularly useful in opto-electronic applications. These methods for electron injection will be described in the descriptions of the relevant preferred embodiments in the following sections.

The Planar Electron Emitter (PEE) according to the present invention has now been demonstrated through a description of one preferred embodiment shown in FIG. 3. There exists however a large number of other embodiments, all according to the present invention, that relate to different choice of materials, of design and of preparation and construction of the said Planar Electron Emitter, the said differences being dictated by the requirements of the applications at hand. It should be stressed that even though electrons are emitted into free space in the PEE used to describe the basic principles of QB-semiconductors, it is not a demand. As some of the other possible embodiments will show, the basic characteristic of QB-semiconductors, the quasi-ballistic transport of electrons, can also improve many non-emitting semiconductor devices.

EXAMPLES OF APPLICATIONS

Description of the Preferred Embodiments

A number of applications of the present invention, besides the planar electron emitter, will now be illustrated and discussed in some detail with reference to FIGS. 3 to 24. The generality of each application field using the present invention has to be stressed at this time, although each application field and/or product will be illustrated with a help of a specific preferred embodiment and relevant Figure(s). To each such preferred embodiment there exists a large number of other embodiments and/or modifications of the preferred embodiment, that all use the present invention as a crucial component. Therefore it is essential that the description of the present invention already given in the previous sections and the description of the applications of the present invention to be given in the following, are not construed as limiting the scope of the present invention and its applications.

Example 1

Field Emission Flat Panel Displays (FE-FPD)

One of the obvious applications of the present invention is its use in the construction of robust, reliable, large, low power dissipation and cheap Field Emission Flat Panel Displays (FE-FPD).

Figure 4:
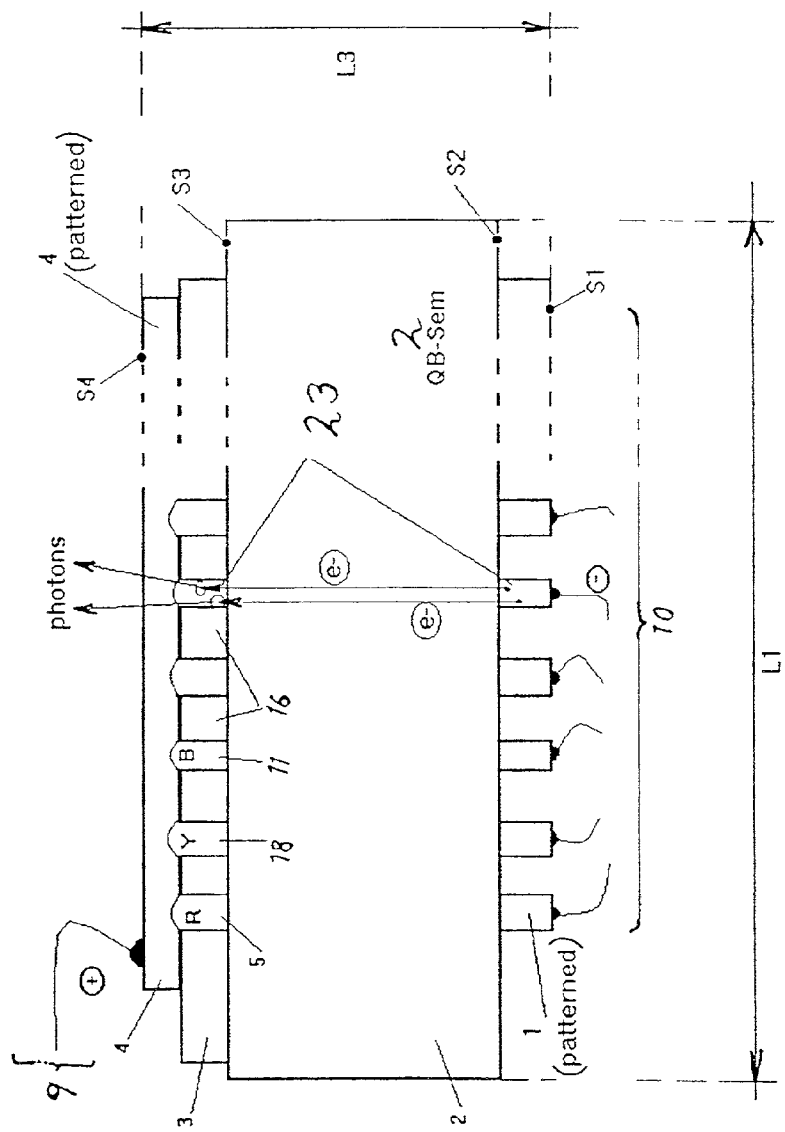
FIG. 4 is a schematic side view if a flat panel display showing the patterned electrodes and luminophor, the latter being placed between the QB-Semiconductor substrate and the anode.
Figure 5:
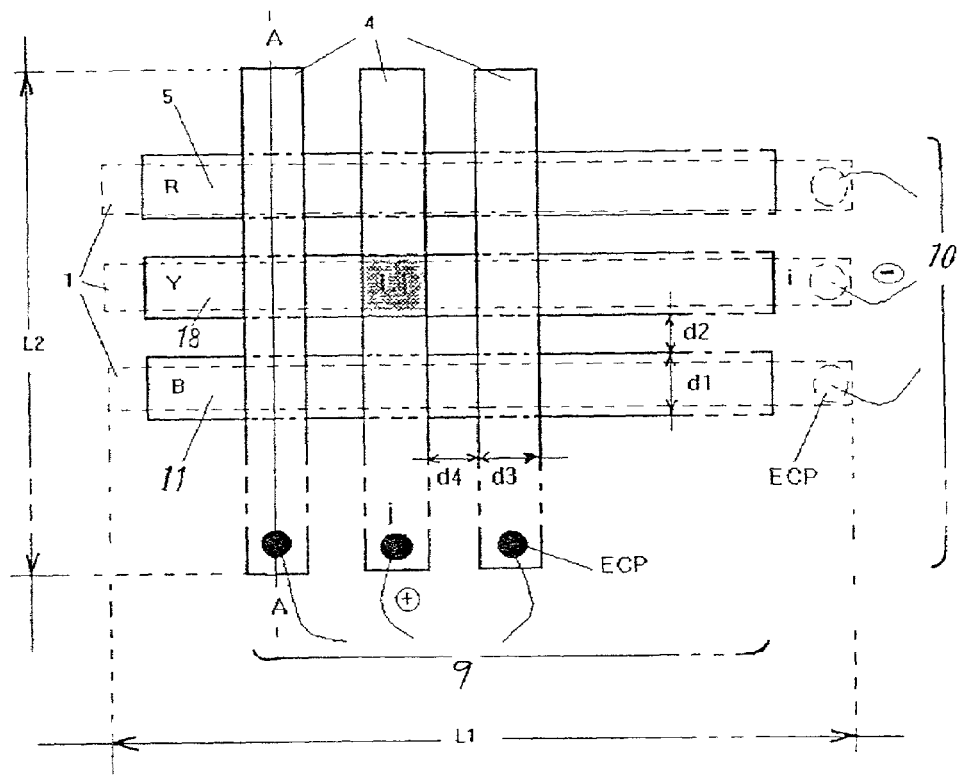
FIG. 5 is a top view of FIG. 4.

FIG. 4, which is a cross-sectional diagram along the line A-A of the FE-FPD shown in FIG. 5 is one of the possible vacuum-less FE-FPDs according to the present invention With reference to FIG. 3, the basic planar structure of the present invention—1 (cathode), 2 (QB-Sem) and 4 (anode—optically transparent in this preferred embodiment) is clearly apparent also in FIG. 4. The only difference is that in this Flat Panel Display application of the present invention the cathode and the anode are patterned and that an extra layer 3 is introduced between the surface S3 of the QB-semiconductor and the anode 4. This third layer consists of alternative (patterned) segments of red 5, yellow 18 and blue 11 phosphors or other colour light emitting luminophor. The segments are separated from each other by light non-emitting, electron absorbing material 16.

The patterning of layers 1, 3 and 4 enables selective addressing ("switching-on" an element 23 (i, j) by application of the appropriate voltages) of the individual colour segments ("pixels") and is shown in FIG. 5. Here the cathode 1 (in form of metallic parallel strips) is deposited onto the back surface S2 of the QB-semiconductor 2. Red 5, Yellow 18 and Blue 11 luminophor strips are deposited on the front surface S3 of the QB-semiconductor 2, in alignment with the said cathode strips, as shown in FIG. 5. Finally the anode 4, also in form of metallic, parallel strips, is deposited on the top of the layer 3, with anode metallic strips at right angles to the cathode metallic strips, as indicated in FIG. 5.

The electrical leads 9 and 10 are attached to the respective metallic strips of the anode and the cathode via electrical contact pads ECP, the whole cathode-anode structure forming in this way selectively addressable matrix of single colour light emitting elements. The element (i, j) is switched on by applying an appropriate voltage between the line i—(cathode) and the line j—(anode). The electrical leads 9 and 10 are connected to the usual TV a/c circuitry that drives the whole FE-FPD shown schematically in FIGS. 3, 4, 5, 6 and 7. The dimensions d1, d2, d3 and d4 of the pixel matrix can be optimised at will, using the standard semiconducting patterning technology to fit the spatial resolution requirements of FE-FPD at hand.

The typical over-all size L1 L2 of a "single chip" FE-FPD depicted in FIGS. 4, 5, 6 and 7 is at present of the order of 20 cm by 20 cm, with the availability of 30.0 cm diameter Si wafers. When large colour displays are needed, a arbitrary number of "single chip" modules can be joined together on an appropriate substrate, using the segments d2 and d4 (see FIG. 5) as joining regions, preventing in this way the spatial degradation of the formed optical image quality. The thickness L3 of the said FE-FPD depicted in FIGS. 4, 5, 6 and 7 is of the order of one millimeter, this thickness being essentially the thickness of the QB-semiconductor wafer.

Figure 6:
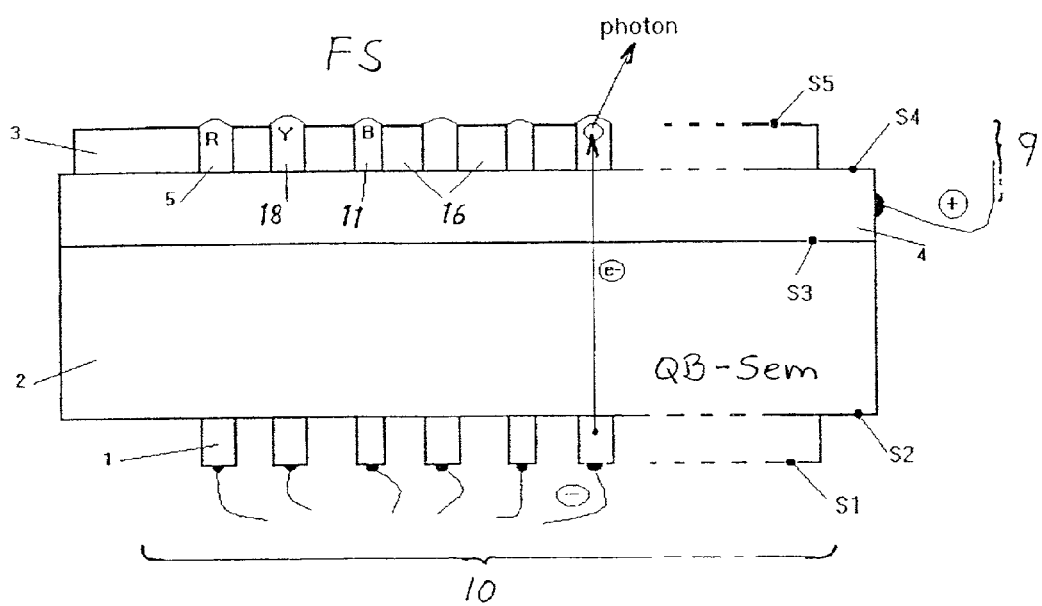
FIG. 6 is an alternative embodiment to the flat panel display according to FIG. 4, in which the luminophors are placed after the anode.

In FIG. 6, the layers 3 and 4 are switched over in order to illustrate yet another possible physical form of the said FE-FPD. Here the colour light layer 3 faces directly the free space FS. If needed, the surface S5 can contain a protective, transparent (anti-reflection) coating.

It has to be stressed at this point that the segments 5, 6 and 11 shown in FIGS. 4, 5, 6 and 7 do not have to be necessarily luminophor. The colour light-emitting layer 3 represents also other types of electron-to-colour-light conversion materials and/or devices. One such type is an arrangement, which can be described with the help of FIG. 4. In this case the structure 1 (cathode), 2 (QB-semiconductor), Red/Yellow/Blue elements (5, 18, 11) and 4 (anode) form a matrix of Colour Light Emitting Diodes (CLED). Other FE-FPD arrangements, using the present invention are of course also possible and the preferred embodiment shown in FIGS. 5, 6 and 7 should in no way considered as a limiting the scope of the present invention in this field of application.

Finally, in cases where the requirement of colour definition, brightness and colour contrast are not met with luminophors and/or other electron-light conversion elements/devices that are at hand today, the standard TV colour phosphors may be still needed that require quite high electron energies (high acceleration voltages in the region of some 10 to 20 kV). A vacuum Field-Emission Flat Panel Display may be then still a most optimal solution and one possible physical form, using the present invention, is shown in FIG. 7.

In this configuration, the colour light emitting layer 3 shown in FIGS. 4, 5 and 6 is removed from the basic planar electron emitter structure 1 (cathode), 2 (QB-semiconductor) and 4 (anode) and it is deposited on the optically transparent (glass for example) plate 13 that forms, together with parts 14 and 12, the vacuum encapsulation of the said vacuum FE-FPD. The electron acceleration electrode 7 that is deposited onto the layer 3 is biased to the appropriate high positive voltage. This arrangement secures that the quasi-ballistic electrons that leave the basic planar electron emitter structure (attached mechanically to the base plate 12 via mechanical supports 15) through the surface S4, are accelerated within the free space FS (now vacuum) to sufficiently high energies in order to secure the proper functioning of the standard colour TV phosphors 5, 6 and 11.

Figure 7:
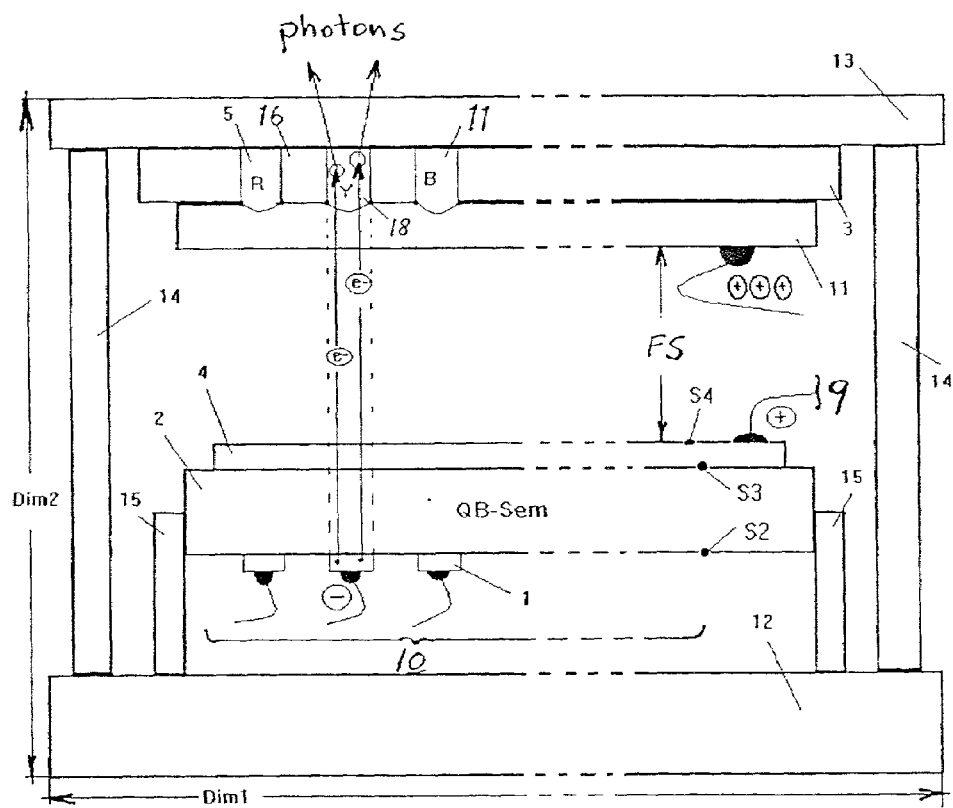
FIG. 7 is another alternative to the flat panel display according to FIG. 4, in which an electron acceleration electrode are incorporated, and the luminophors are placed after the accelerating electrode.

The thickness (Dim 2) of the vacuum FE-FPD shown in FIG. 7 is of the order of one to two centimeters, while the area (Dim 1) is unchanged in relation to the previously described vacuum-less FE-FPD.

Example 2

Planar Electron Beam Lithography

By using the planar electron emitter according to the present invention the major drawback imposed by the short lifetime of the prior art planar electron emitters, are solved. The present invention offers a qualitatively new and robust solution to the present day needs of the semiconductor industry. The method and the embodiment are described in FIGS. 9 to 14.

The schematic diagram of the principle behind the Planar Electron Beam Lithography, was described in the prior art using FIG. 8. In the prior art, an electron lithographic projection system has been demonstrated using a prior art planar electron emitter. The planar electron emitter of the present invention can be directly implemented in place of the prior art emitter.

Figure 10:
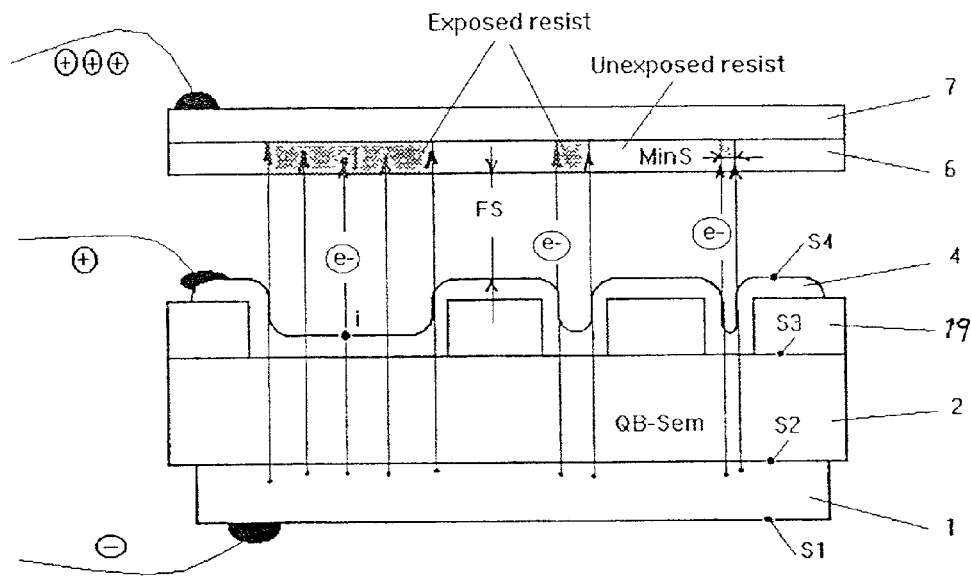
FIG. 10 is equivalent to FIG. 8 but with a planar quasi-ballistic electron emitter according to a preferred embodiment of the present invention.

One possible embodiment according to the present invention of such a planar electron emitter structure is shown in FIG. 10. The major difference from prior art FIG. 8 is the replacement of a thin film oxide layer 24 in FIG. 8 by a quasi-ballistic semiconductor QB-Sem 2 in FIG. 10. Turning now to FIG. 10, the electrons, injected from the cathode 1 into QB-semiconductor 2 through the surface S2, travel along the quasi-ballistic trajectories within the QB-semiconductor. They emerge, through the surface S3 and enter either the patterned absorbing template 19 or the anode 4. The part of the quasi-ballistic electrons, not stopped by the electron absorbing template 19, then have enough energy to enter the free space FS through the surface S4 as for example the electron at point i. These electrons are then accelerated within the free space region, FS, to sufficiently high energies by the electron acceleration electrode 7. The electron acceleration electrode 7 consists in this particular illustration of the wafer and the deposited electron sensitive resist 6.

Through electron-optical means, the electrons that emerge for example at point i (FIG. 10) are imaged into point j, lying within the resist layer 6. In this way the entire lithographic pattern (layer 19) can be transferred onto the said wafer-resist assembly at once and not sequentially as is the case with the standard Electron Beam Lithographers. Also, there are no principal limits on the lateral dimensions of the patterned layer 19 and this means that the entire wafer can be processed in one exposure. The minimum feature obtainable ("MinS") lies well below 0.15 micron, if the electron-optical system, together with the planar electron emitter part of the electron 1:1 projection stepper is optimised. Furthermore, by exposing the whole wafer at once, the throughput of such a planar electron beam lithographic system is very large. A number of other arrangements of planar electron lithographer are possible, an arrangement shown in FIG. 10 being just one of them.

Figure 9:
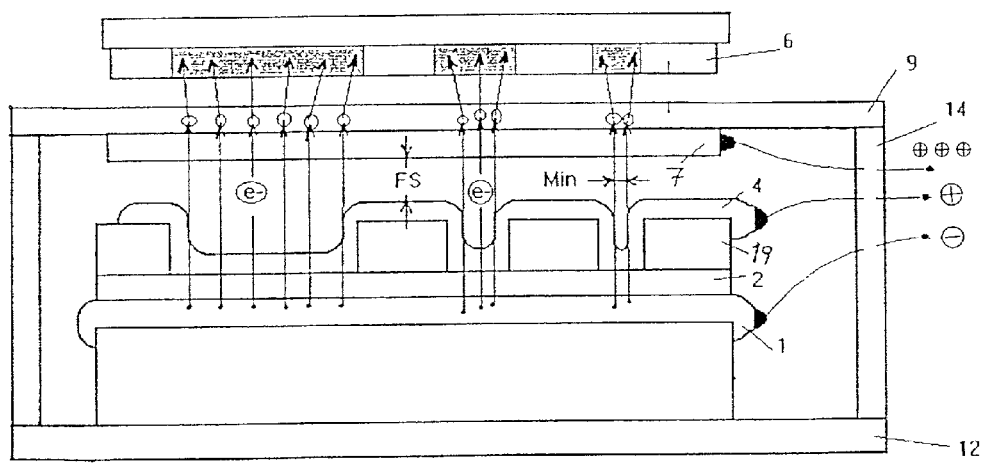
FIG. 9 is an alternative embodiment according to FIG. 8, in which the substrate to be exposed is placed after the electron acceleration electrode and outside the vacuum while the total structure of QB-Semiconductor and electrodes are placed in vacuum.

One of possible alternatives to the embodiment shown in FIG. 10 is shown in FIG. 9. Referring to FIG. 9 now, the same basic quasi-ballistic electron emitter structure, as discussed in reference to FIG. 10, is clearly apparent. In the particular preferred embodiment shown in FIG. 9, an accelerating electrode 7 and electron scintillator 17 structure has been inserted between the planar electron emitter structure 1, 2, 19, 4 and wafer plus photo-resist part 6. Such an arrangement allows for the planar electron projection system to be under vacuum (it is the region 17, 12 and 14 that form the vacuum encapsulation of the said electron emitter structure), operating continuously if necessary, while the wafers to be processed can be placed on the top of the scintillator 17. Operating in vacuum gives a better electron transmission from the emitting surface to the wafer, and without a need for prior evacuation, the throughput of the whole device is increased. If the air space, indicated in FIG. 9 is sufficiently small, the degradation of the size of the minimum feature "Min" due to optical spreading can be kept to minimum.

Figure 11:
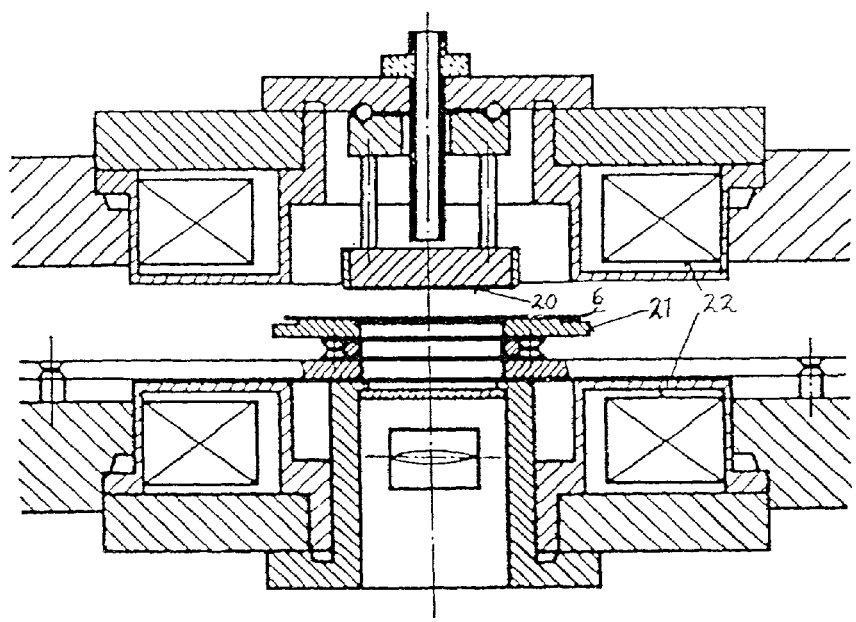
FIG. 11 is a schematic drawing of an apparatus for implementing planar quasi-ballistic electron emitters in Planar Electron Beam Lithography.

In the publication by some of the inventors of the present invention mentioned in the prior art (H. Ahmed et al.: "Proceedings of the Conference on Microlithography"; Cavendish Laboratory, Cambridge 1989), it is shown and demonstrated experimentally in FIGS. 11, 12, 13 and 14 how to carry out Planar Electron Beam Lithography in practice. An apparatus—"Experimental 1: 1 Electron Projection Stepper" is disclosed and its performance that met all the industrial needs and requirements concerning the necessary lithographic steps during IC production has been clearly demonstrated. Its schematic diagram is shown in FIG. 11. Here 20 is the said cathode-QB-Sem-anode assembly (very similar in construction to the arrangement shown in FIG. 10—parts 1, 2, 19 and 4), 6 is the wafer substrate with the deposited resist layer, 21 is the x, y positioning table and finally 22 is a pair of Helmholtz coils to generate a homogeneous magnetic field between the cathode-anode assembly and the wafer—x,y table assembly. In this particular arrangement, it is the cathode-QB-Sem-anode assembly that was negatively biased with the respect to the wafer substrate that was kept near ground potential. The emitted electrons have been accelerated in the established electrical field from high negative potential towards ground. The parallel electrical and magnetic fields formed in this way an electron-optical 1: 1 projection system that transferred the electrons emerging from a particular point on the bottom surface of the cathode-QB-Sem-anode assembly 20 to a single point within the resist layer 6 (see also FIG. 10).

Figure 12:
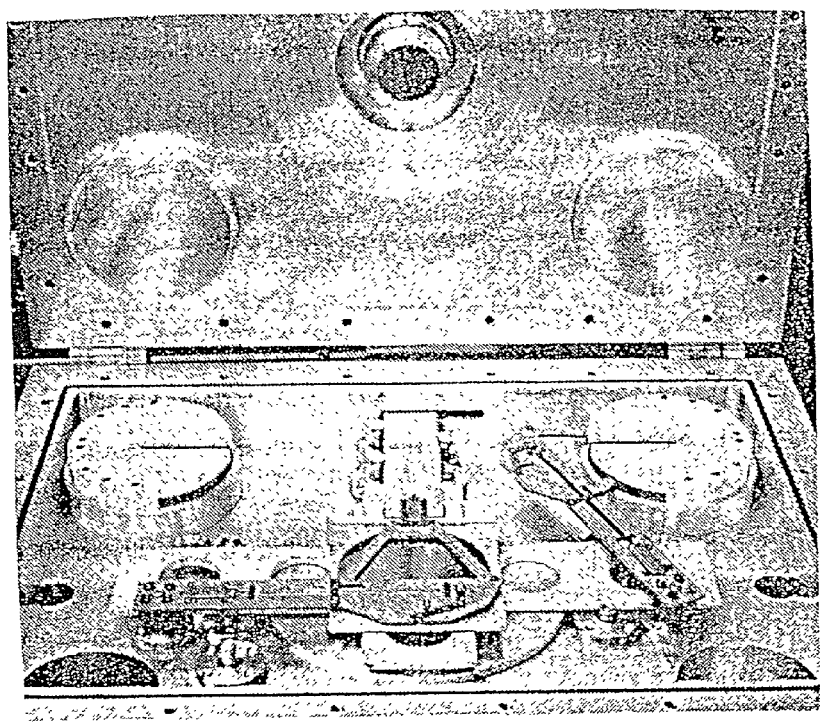
FIG. 12 is a photograph of the apparatus of FIG. 11.
Figure 13:
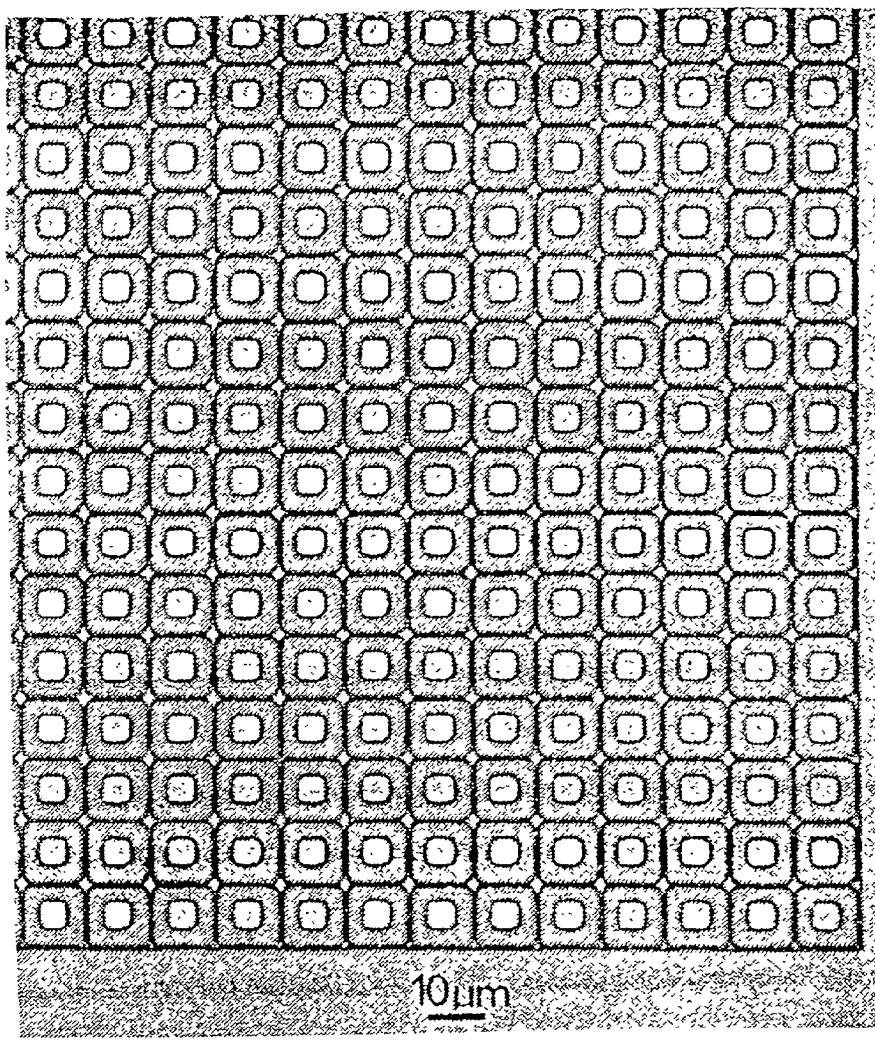
FIG. 13 is one possible template as mentioned under FIG. 10.
Figure 14:
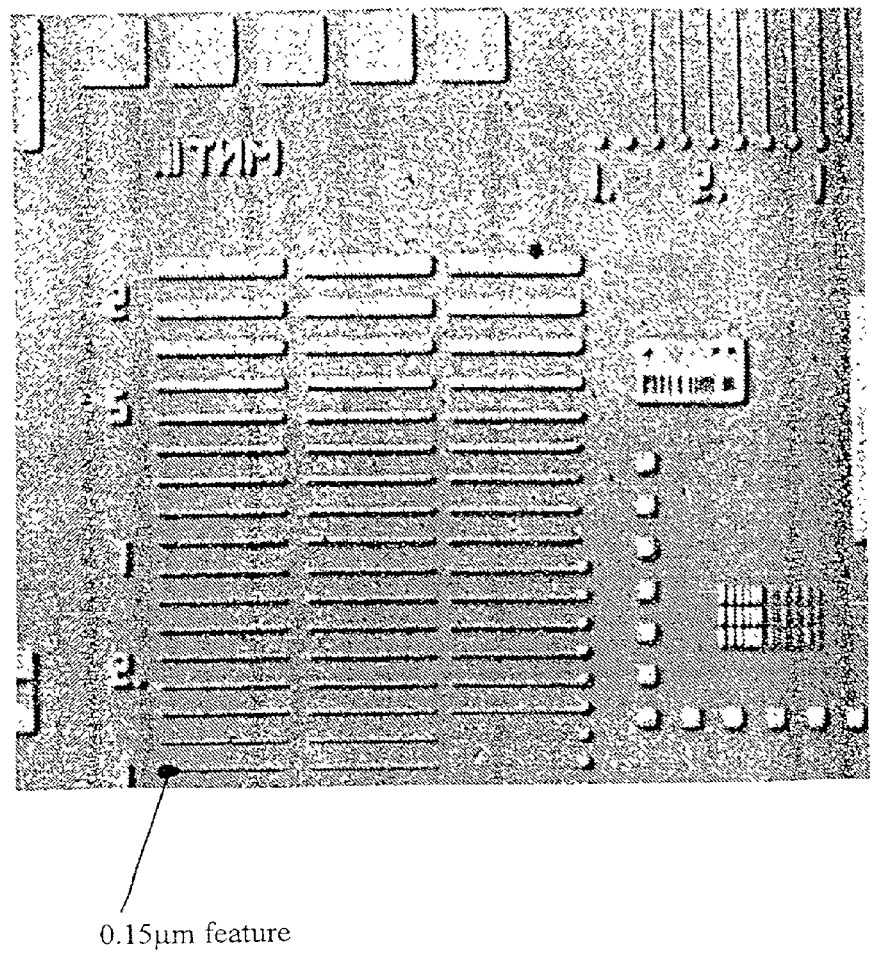
FIG. 14 is a scanning electron microscope photograph showing some structures made by Planar Electron Beam Lithography.

The over-all view of the said experimental 1: 1 electron projection stepper is shown in FIG. 12 and some typical experimental results of wafer patterning in FIGS. 13 and 14. Both positive and negative resists were tested and with typical exposure times of the order of 0.1 seconds, the minimum features easily attainable (length "Min" in FIG. 8) were in the region of 0.15 microns (FIGS. 13 and 14). While a part of the whole, exposed and patterned (repetition of test patterns) silicon substrate is shown in FIG. 13, the structural details of the test patterns are shown in FIG. 14, clearly demonstrating the 0.15 micron minimum feature capability of this prototype instrument.

Example 3

Two-Dimensional Illumination Panels

Due to the simplicity of design, robustness, low power dissipation, low temperature operation and two-dimensional nature of the planar electron emitter according to the present invention, the said planar electron emitter can be used very conveniently in the construction of two-dimensional (planar and non-planar) illumination sources.

Figure 15:
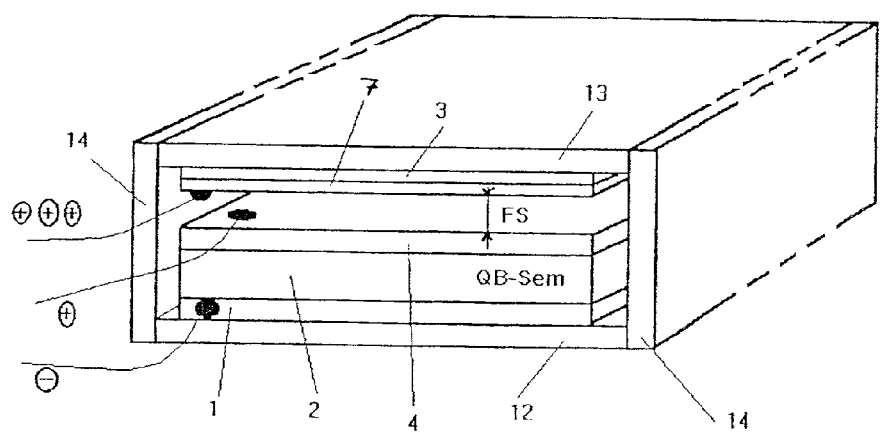
FIG. 15 is a 3D view showing the interior of the embodiment according to two-dimensional illuminating panels.
Figure 16:
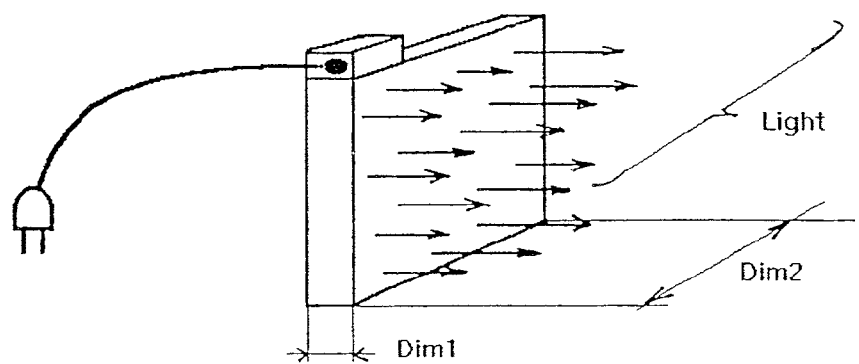
FIG. 16 is a 3D view showing the exterior of the embodiment of FIG. 15.
Figure 17:
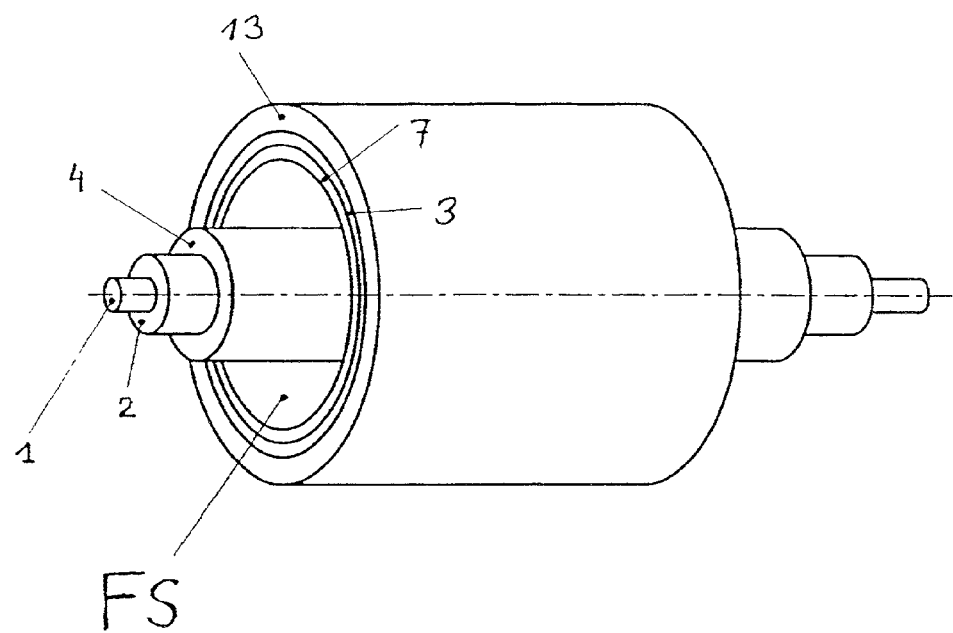
FIG. 17 is an alternative embodiment according to two-dimensional illuminating panels.

One such possible flat illumination panel is shown schematically in FIGS. 15 and 16. Here the basic structure of the planar electron emitter (cathode 1, QB-semiconductor 2 and the anode 4) is used as planar source of electrons (when an appropriate electrical voltage is applied between the cathode and the anode) emerging into the free space FS. These electrons are accelerated within this space by means of the accelerating electrode 7 and enter the light emitting layer 3. The optically transparent plate 13 (typically a glass plate) that allows the generated light to escape from the said structure forms (together with plates 14 and 12) the vacuum encapsulation of the whole assembly.

In another possible arrangement, the light emitting layer 3 is left out and the free space FS is filled with an appropriate gas and/or gas mixture, the necessary illumination being now generated through gas ionisation and fluorescence. The typical dimensions of the above-described flat illumination are indicated in FIG. 16. While "Dim1"—the thickness of the illumination panel can be easily under one centimeter; the "Dim2" can be easily of the order of meters.

Because of the simplicity of construction, the present invention can be used also in the construction of non-planar (round) two-dimensional illumination sources. One of the possible arrangements of such a source is shown schematically in FIG. 17. Here, the cathode 1, the QB-semiconductor 2 and the anode 4 are concentric cylindrical layers. The QB electrons emerge into the free space FS radially and after acceleration via accelerating electrode 7, they enter the light emitting region 3. The generated light escapes through the transparent (glass) envelope 13. Also in this arrangement, the light emitting layer 3 can be left out and the free space can be filled with the appropriate light emitting gas.

Example 4

Semiconductor Components and Devices

In what follows, only a brief description of some typical applications of the present invention within the field of semiconductor components, devices and Integrated Circuits' manufacture will be given and these must be considered only as few illustrative examples and in no way should they represent a limiting factor as far as the use of the present invention within this field is concerned. The examples to be shown, have been chosen from four different major classes (A to D) of semiconducting components/devices where the present invention can be used.

In these examples, the basic structure (the cathode, QB-semiconductor and the anode) of the present invention is preserved, although in some applications only the properties of quasi-ballistic electrons between the two electrodes are utilised, rather than their ability to escape into free space FS (see FIG. 2). The names "cathode" and "anode" will not always be used now in attempt to use more the terminology of Semiconductor Physics. These electron transmitting properties of the QB-Semiconductor are very similar to the properties of electrons moving between a cathode and an anode in a vacuum tube, only now no vacuum is needed. The injection of electrons from the cathode takes place at room temperature and the whole device in question can be made of submicron dimensions. In this way the present invention combines all the advantages of vacuum tubes and modern all solid state semiconductor technology.

Example 4a

Class A

Rectification and Charge (Information) Storage

Semiconductor components/devices in this class include bipolar p-n, p-i-n diodes, thyristors as well as a number of unipolar devices such as MIS (Metal-Insulator-Semiconductor) diodes, CCD (Charge Coupled Device). MIS tunnel diodes, MIS switch diodes, IMPATT (Impact Ionisation Avalanche Transit Time) and BARITT (Barrier Injection and Transit Time) diodes and other related Transit Time devices.

Example

Quasi-Ballistic Schottky Diode

Figure 18:
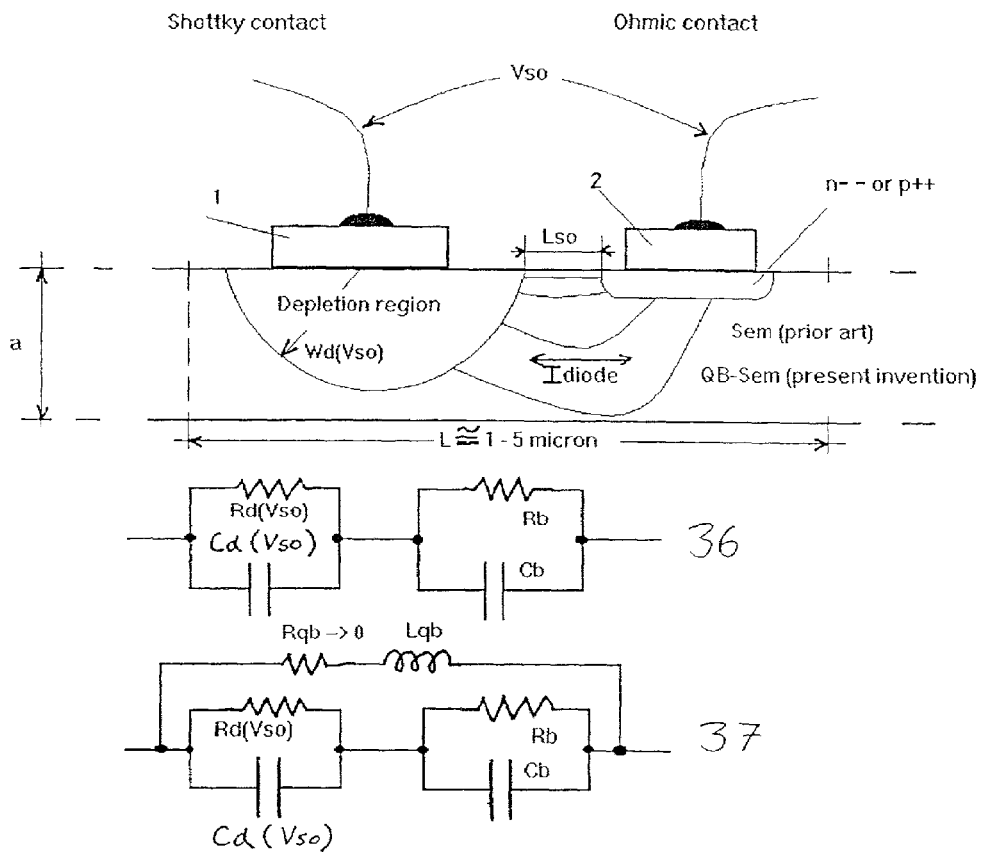
FIG. 18 is a schematic diagram of a typical, fast, planar Schottky barrier diode according to the present invention.

FIG. 18 is a schematic diagram of a typical, fast, planar Schottky barrier diode according to the present invention. Also displayed are the equivalent R, C electrical networks 36 and 37 (see U.S. Pat. No. 5,627,479 and EP 672 257 B1), describing the electrical response of a prior art diode 36 and a QB-Semiconductor diode 37.

In reference to FIG. 18 now, the diode current $I_{diode}$ is controlled by the depletion resistance Rd which is in turn determined by the extend of the depletion region $W_d$. This depletion region length (width) $W_d$ is exponentially dependent on the applied voltage $V_{so}$ between the Schottky and Ohmic electrical contacts. The rectification action is achieved through the control of $W_d$ by $V_{so}$, which in turn induces exponentially strong changes in Rd that controls the diode current $I_{diode}$ (forward and reverse diode current). Since there is no electron velocity saturation at high electrical fields, it is not necessary to diminish the over-all dimension L, and in particular the distance $L_{so}$ between the front of the depletion region and the ohmic contact, in high frequency applications. The Quasi-ballistic Schottky diode according to the present invention will be workable at higher frequencies and will be characterised by simpler design and very low power dissipation through shunting of the resistor $R_{qb}$ by $L_{qb}$ (quasi-ballistic electrons' kinetic inductance) in 37 of FIG. 18.

Example 4b

Class B

Photo-Sensing and Photo-Emitting Devices

This class of semiconducting components/devices include among others LEDs' (Light Emitting Diodes), Photodiodes, Semiconducting Lasers, Avalanche diodes and other photoconducting devices for light to electrical signal conversion purposes.

Example

Quasi-Ballistic Photodiode and Quasi-Ballistic Light Emitting Diode

Figure 19:
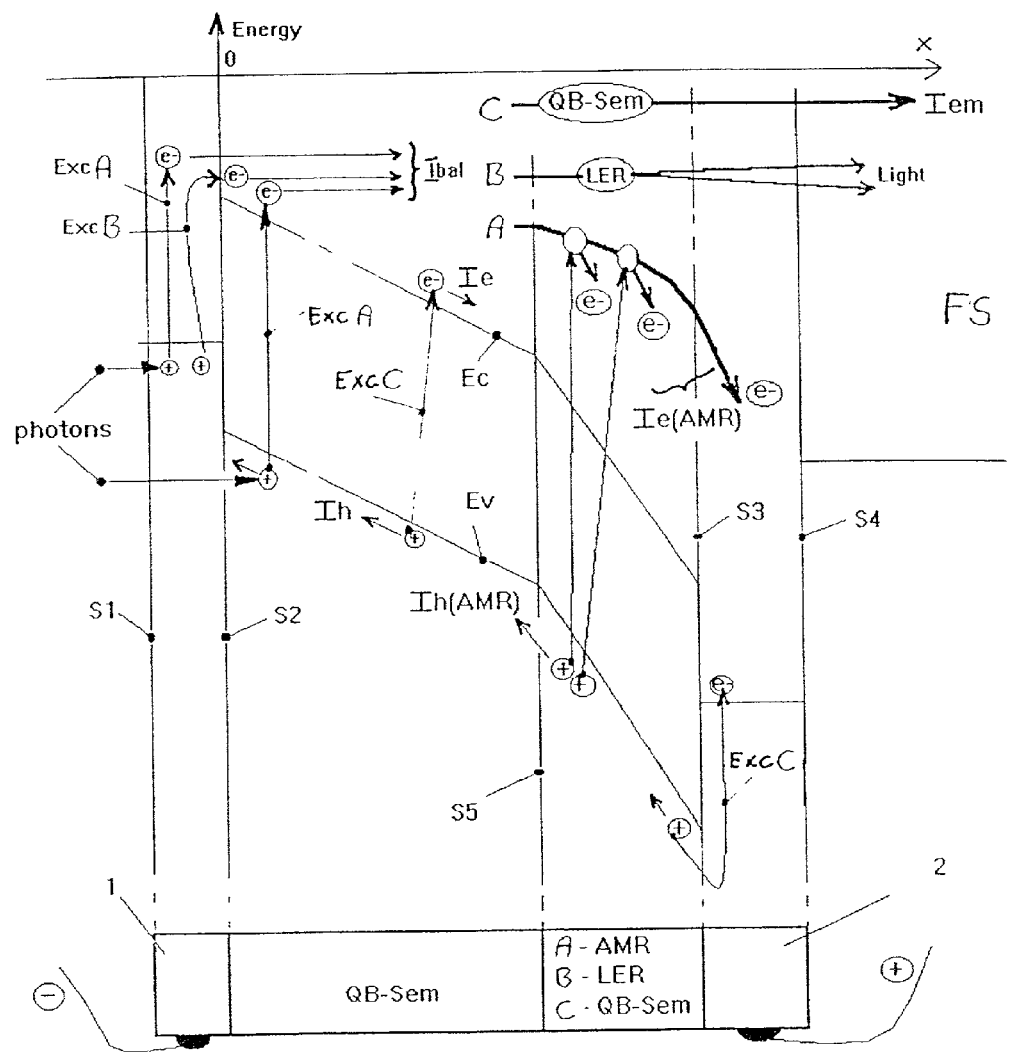
FIG. 19 is schematic and simplified electron energy band diagram according to the embodiments of Photo-Sensing and Photo-Emitting devices.

A simplified energy band diagram shown in FIG. 19 illustrates the physical principles behind and one possible construction (preferred embodiment) of a quasi-ballistic photodiode (A-references), a quasi-ballistic Light-Emitting diode (B-references) and one of the possible constructions (preferred embodiment) of a first stage of an optical signal detection/amplification/spatial magnification device (C-references), all according to the present invention These devices will be now discussed in turn.

Quasi-Ballistic Photodiode (Process A in FIG. 19).

The optical signal (incoming light) is absorbed within the cathode region (region between the surfaces S1 and S2—FIG. 19) and a thin region within the QB-semiconductor that lies close to the surface S2, creating in this process a number of electron-hole pairs (process marked "Exc1" in FIG. 19). The photo-excited electrons then constitute the quasi-ballistic current Ibal, are accelerated and enter the avalanche multiplication region AMR through the surface S5. The avalanche multiplication process AM leads to an amplified electrical current signal $I_e$ and $I_h$. In some applications the avalanche multiplication region AMR can be left out, the electrical signal from the photon-electron conversion ("Exc1") being sufficiently amplified through the acceleration of the generated quasi-ballistic electrons.

The described quasi-ballistic photodiode according to the present invention has high quantum efficiency, relatively very low power dissipation and can be manufactured in a form of two-dimensional photo-sensor array when two-dimensional optical image (signal) detection and processing is required.

Quasi-Ballistic Light-Emitting Diode (Process B in FIG. 19).

In the case of Light-Emitting device, the electrical signal (voltage bias between the cathode and the anode) that can be also time modulated if needed (opto-electronic applications), controls the amount of injected electrons that enter the QB-semiconductor region QB-$S_{em}$ (process "Exc2" in FIG. 19). After acceleration, while moving through the QB-Sem region, these electrons (current $I_{bal}$ in FIG. 19) enter the Light Emitting Region (LER) through the surface S5 and create photon flux through the process of recombination across the band gap $E_g$ (see FIG. 2 and process B in FIG. 19). This photon flux (that is also time modulated if the cathode-anode voltage bias ~$\Delta Q$ (t) is time dependent) then finally emerges into the free space FS.

When the electron injection process "Exc2" is of sufficient intensity and the light emitting region LER (normally heavily p-doped) satisfies the necessary conditions for population inversion, the above described device will function as a quasi-ballistic semiconductor laser with a very low power dissipation, high efficiency and can be used very effectively in opto-electronic applications such as optical fibre signal transmission and telecommunications in general.

Optical Image Detection and Processing (Process C in FIG. 19).

In some applications it will be necessary and/or advantageous to process the quasi-ballistic current $I_{bal}$, formed either through process "Exc1" and/or through process "Exc2", electron-optically. In this case the region between the interface S5 and S3 is just a continuation of the quasi-ballistic semiconductor region QB-Sem as shown in FIG. 19. After traversing the anode region, these quasi-ballistic electrons emerge through the surface S4 into the free space FS as the electron emission current $I_{em}$ that can be now processed electron-optically. A device of this type will described in Example 4d.

Example 4c

Class C

Amplification and Non-Volatile Memory

Applications of the present invention in this class of semiconductor components/devices include also bipolar transistors and bipolar unijunction transistors, together with a number of unipolar components and devices inclusive FETs (Field Effect Transistor), JFETs (Junction Field Effect Transistor), MESFETs (Metal-Semiconductor Field Effect Transistor), MOSFETs (Metal-Oxide-Semiconductor Field Effect Transistor) and Non-Volatile Memory devices. Particularly relevant in relation to present invention within this class are tunnel transistors, TEDs (Transferred-Electron Devices) and other ballistic (Hot Electron) transistors and/or devices.

Example

Quasi-Ballistic Transistor

Figure 20:
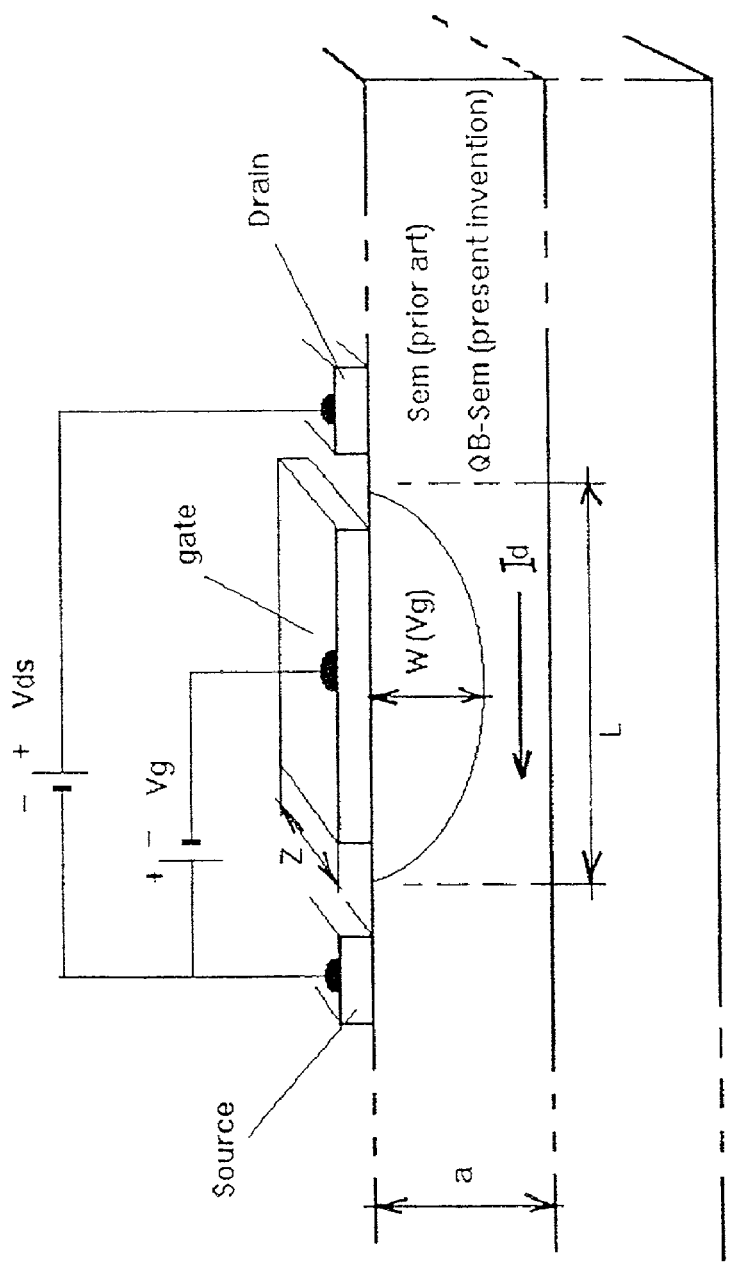
FIG. 20 is a schematic diagram of a typical planar Metal-Semiconductor Field Effect Transistor (MESFET).

FIG. 20 is a schematic diagram of a typical planar Metal-Semiconductor Field Effect Transistor (MESFET). The current id between the source and the drain electrodes is controlled by the voltage $V_g$ through changing the active depletion width $W_d(V_d)$. "a" is the electrically active part of the substrate semiconductor SEM, "L" is the conductivity channel length and "Z" is the width of the device. When a high-speed performance is required, the channel length has to sufficiently reduced (<1.5 micron) and the typical operating voltages $V_{ds}$ create high electrical fields between the source and the drain. The velocity of electrical charges (electrons) becomes then saturated (electrical field dependent mobility region is reached) and this limits the speed of the said device operation.

Now, even if the geometrical design of the said MESFET transistor as shown in FIG. 20 is kept the same for the sake of simplicity and clarity of the argument, the two above mentioned design constraints (small geometry and electron velocity saturation) are non-existent, when such a MESFET transistor is constructed according to the present invention. Given the form of the device as shown in FIG. 20, this involves simple replacement of the standard semiconductor substrate Sem (see FIG. 20) by the quasi-ballistic semiconductor QB-Sem.

MESFET device according to the present invention and depicted in FIG. 20 is characterised not only by fast response (high frequency response), but also by very low power dissipation since source-drain current Id is quasi-ballistic in nature.

It has to stressed at this point again that the design structure of MESFET transistor shown in FIG. 20 is only one of a large number of possible designs of an amplification I switching device. Due to the nature of the present invention, other more optimal designs are possible and will be realised. These will take over some design features from vacuum tubes (see for example the above-mentioned publication by K. W. Boer: p. 1237).

The same and/or very similar arguments as discussed above for the case of MESFET transistor lie behind the construction of Metal-Oxide-Semiconductor Field Effect Transistor (MOSFET), Non-Volatile memory MOSFETs and other devices within this class according to the present invention All of these devices are characterised by simplicity of design, robustness, high response speed and very low power dissipation.

Example 4d

Class D

Optical Image Detection, Formation and Processing

Due to two-dimensional nature of the present invention, large areas optical signal detection, conversion and processing is possible. Taking electromagnetic radiation as an example, the present invention can be used in a number of ways:

Conversion of recorded electrical signals (electrically recorded optical images) back to two-dimensional images/signals (Quasi-ballistic semiconductor Field-Emission Flat Panel Display—see also Example 1).

Conversion of two-dimensional optical images to electrical signals (Quasi-ballistic semiconductor camera)

Two-dimensional optical image detection the resulting electrical signal amplification, followed by two-dimensional optical image spatial magnification and final two-dimensional optical image recording. The result of this type of optical image processing is the original two-dimensional optical image, but now contrast/intensity amplified and spatially magnified.

The two last ways are both two-dimensional detector arrays of electromagnetic radiation to be used in optical image detection, formation and processing. This involves what could be roughly defined as two basic applications of the present invention:

a) Quasi-ballistic semiconductor camera (Conversion of 2D-optical images/signals to electrical signal sequences)

b) A system for 2D-optical image/signal brightness/contrast amplification and spatial magnification In this paragraph a short description of QB-semiconductor camera a) and of optical image/signal processing system b) will be described. For the sake of clarity and simplicity, the two applications will be described assuming the optical signal to be in the form of two-dimensional optical image formed by the photons from within the visible part of the electromagnetic radiation spectrum. This of course must not be considered in any way as a limiting factor in relation to the present invention and its use within this class of applications. The optical signal to be detected/processed may well be from within other parts of the electromagnetic radiation spectrum and/or it may be a signal formed by other particles. The optical image spatial dimension can also vary from zero to three. Finally, the specificity of the two application examples of the present invention to be presented below, serves purely illustrative/pedagogical purposes and must not be considered either as a limiting factor in relation to the applications of the present invention within this field.

a) Quasi-Ballistic Semiconductor Camera.

Figure 21:
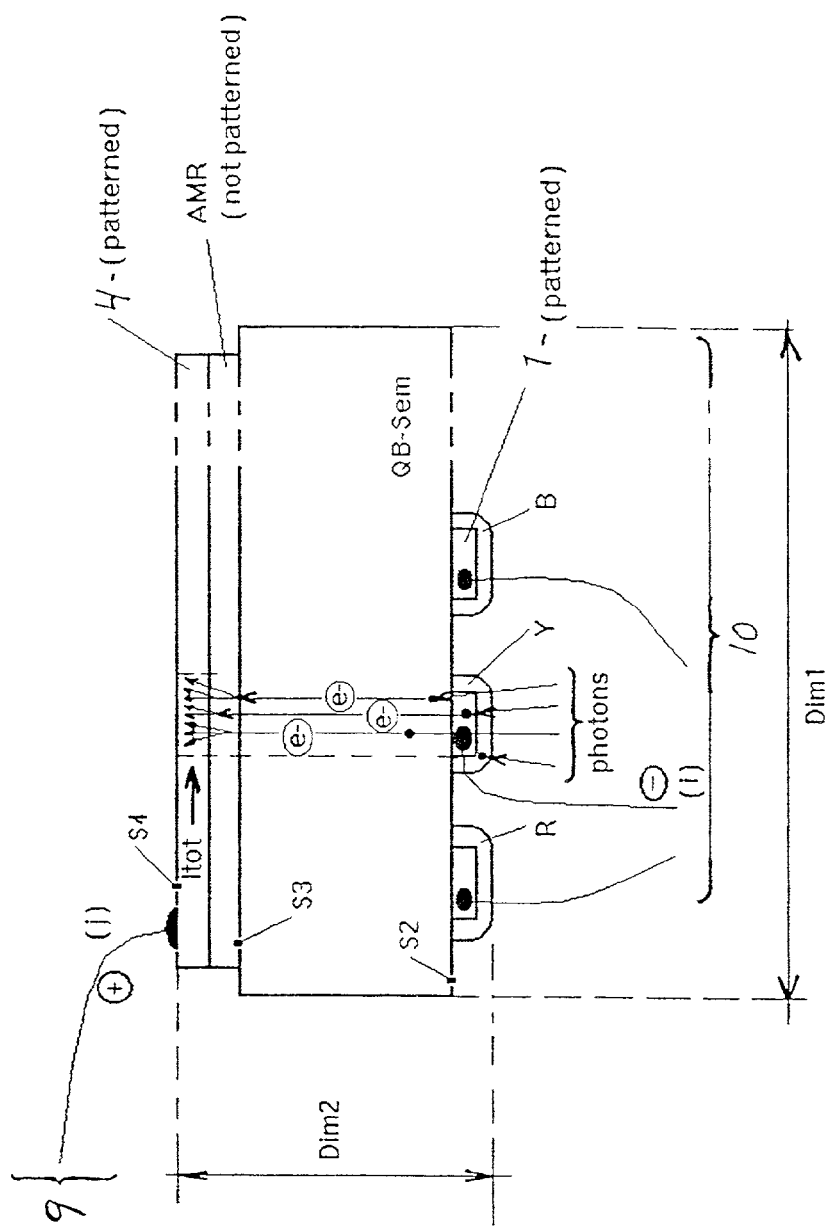
FIG. 21 is a schematic diagram of a device according to the present invention for the detection and recording of two-dimensional optical signals/images.

FIG. 21 is a schematic diagram of a device according to the present invention for the detection and recording of two-dimensional optical signals/images. In this preferred embodiment the QB-semiconductor is sandwiched between a cathode 1 and an anode 4. Both electrodes are patterned in a way similar to x, y patterning shown in FIG. 5. The metal cathode, QB-semiconductor and the anode form a two-dimensional array of Schottky barrier photodiodes that can be addressed individually and sequentially, as illustrated in FIG. 5 (pixel diode i, j—switched on).

The optical image is formed at around the surface S2 and is transformed and processed, with help of the said device, to time sequence of electrical signals in the following way: Optical image forming light (photons) enters the said structure shown in FIG. 21 through appropriate colour filters R (red), Y (yellow) and B (blue) and it is absorbed within the region consisting of cathode-QB-semiconductor interface and QB-semiconductor depletion region, creating in this process a number of electron-hole pairs.

By "switching-on" a particular pixel diode (i, j) by applying an appropriate electrical voltage between a cathode strip "i" and an anode strip "j" (diode with yellow colour filter "Y" in FIG. 21), the created quasi-ballistic electrons are accelerated within the QB-semiconductor region QB-$S_{em}$ (FIG. 21) and if needed can be amplified further by avalanche multiplication within the avalanche multiplication region AMR (FIG. 21)—The resulting current pulse then forms the electrical signal which is related to the light intensity of "yellow" photons impinging on the pixel (i, j) shown in FIG. 21.

The overall thickness (Dim2) of the said device (QB-semiconductor camera) is in the region of few millimeters, while the active area of the said device (lateral dimension Dim1) can be of the order of up to some 30 centimeters with the present day technology. High quantum efficiency, high spatial resolution, robustness and the simplicity of construction are just few of the attractive features of the proposed device according to the present invention.

b) Optical Signal/Image Processing Device.

In a number of applications (such as astrophysics, infra-red vision/imaging and others), very weak, two-dimensional optical images have to be detected, processed and recorded, with an additional demand for high spatial resolution/magnification and/or for spectral information to be extractable. One of possible devices according to the present invention that fulfils these requirements is shown schematically in FIG. 22. It consists of two parts, where part A is the two-dimensional optical image/signal amplification part, while the part B is the two-dimensional optical image/signal spatial magnification part.

Figure 22:
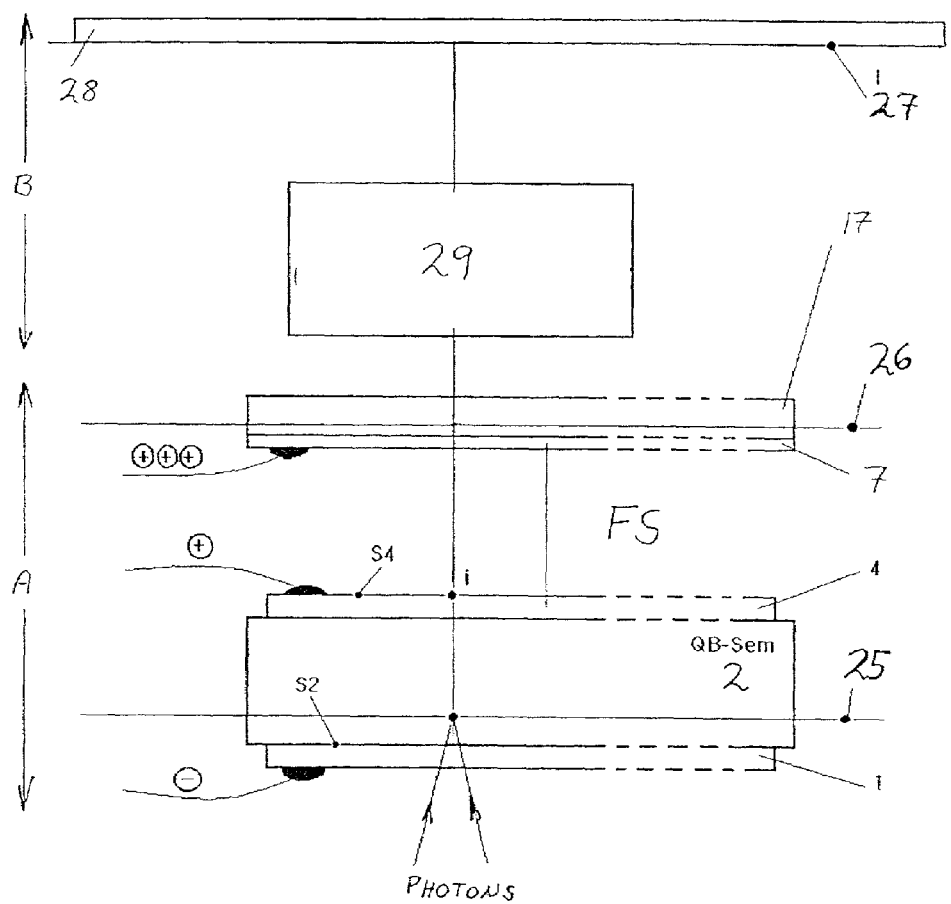
FIG. 22 is a schematic drawing according to the embodiment of an optical signal/image-processing device.
Figure 23:
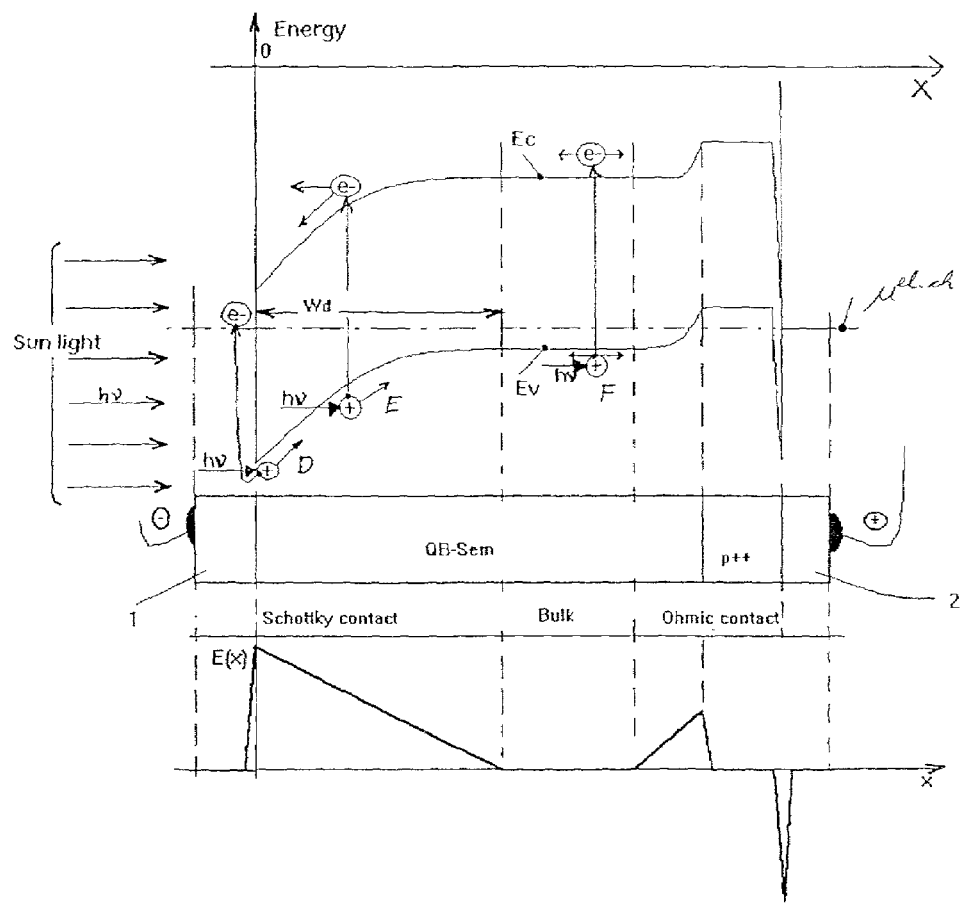
FIG. 23 is a schematic energy diagram of one of the possible constructions of a solar cell according to the present invention.

The incoming photons that forms the optical image in the plane of the primary optical image 25 is absorbed within the region of the cathode, interface S2 and the depletion region of the QB-semiconductor as indicated schematically in FIG. 22, creating in this way a number of electron-hole pairs. This number depends both on the energy of incoming photons (spectroscopic information) and on the number of incoming photons (the signal intensity information). The quasi-ballistic electrons created within the plane of the primary optical image are accelerated within the QB-semiconductor region QB-Sem (primary amplification) and because of their properties they can leave the basic planar electron emitter structure (cathode, QB-semiconductor and the anode) through the surface S4. At the same time though they form in this way also an electron-optical image of the original optical image in the plane of the primary optical image.

After this photon to electron conversion (photon in-electron-hole pair out) and primary amplification (acceleration of the created electrons within QB-Sem region), the obtained electron-optical image formed in the plane of the surface S4 can be processed further by suitable electron optics (not shown). It is further amplified with the help of the accelerating electrode (secondary amplification) and can be if needed spatially magnified (electron-optical primary spatial magnification).

This spatially magnified and intensity amplified electron-optical image is converted back to a second stage optical image with the help of an appropriate electron scintilator 17. The plane 26 of this second stage optical image then becomes the object plane of the final optical magnification system 29 to secure the secondary spatial magnification of the original optical image. The final optical image, that is signal/intensity amplified in part A and spatially magnified in 29 is then formed in the plane 27 of the final optical image ready for recording by a proper optical recording device 28 (photographic plate or CCD). Depending on the spatial resolution required the whole assembly (part A and part B) can be moved laterally within the plane of the primary optical image.

Finally it should be pointed out that because of the characteristic properties of the basic planar electron emitter that forms the bottom portion of the part A of the device, the said planar electron emitter in conjunction with the electron-optical parts within the free space region FS can be used as a spectroscopic device, extracting the necessary information about the photon energy spectrum within the primary optical image.

Example 5

Photovoltaic Applications

Due to very low inelastic scattering and recombination rates of the quasi-ballistic electrons, a Schottky barrier diode according to the present invention is a highly efficient photoconductor and its use in the photovoltaic applications is obvious. One of the possible constructions of a solar cell according to the present invention is shown schematically in FIG. 23.

The said device is formed by QB-semiconductor layer 2 sandwiched between two electrodes—a cathode 1 and an anode 2. While the cathode and the QB-semiconductor form a Schottky rectifying contact, the anode and the QB-semiconductor form an ohmic contact. When constructed in this way (using a p-type QB-Sem), the internal electrical field $E(x)$ within the said device, caused by the electrical charge transfer that takes place in order to establish thermodynamical equilibrium, has a profile shown in the bottom part of FIG. 23.

The sunlight enters the said device (solar cell according to the present invention) from the left (FIG. 23) through the cathode and is absorbed within the structure, creating single electron-hole pair per incoming photon. Three, spatially separated absorption processes can be distinguished. The process D is the generation of electron-hole pair at the interface between the cathode and the QB-semiconductor. The process E is a generation of electron-hole pair within the depletion region of the QB-semiconductor and finally the process F describes the photon absorption process generating electron-hole pair within the bulk of the QB-semiconductor (region of QB-Sem where the internal electrical field is zero). Due to the existence of quasi-ballistic trajectories within the QB-semiconductor a majority of electrons generated especially within the depletion region of the QB-semiconductor will be accelerated by the internal electrical field existing within the depletion region $W_d$ towards the anode without recombination and/or inelastic scattering. This effect increases appreciably the quantum efficiency of the said solar cell. By optimising the structure of the said device through minimising the extend of the bulk region and through an appropriate choice of the cathode material (transparent conducting tin oxide for example), the solar cell according to the present invention represents a very efficient, simple and robust light to electricity energy conversion device with a large active area.

Example 6

Electron Cold Emission Microscopy

There is a potentially very important application of the present invention within the field of defects and/or imperfections investigations in the "virgin" semiconductor wafers by what is termed here as Electron Cold Emission Microscopy (ECEM). This is discussed in relation to FIG. 24.

In the standard version of the Electron Emission Microscopy, a sample to be investigated is heated up to temperatures when the thermal electron emission becomes finite. These electrons leave the sample through a surface and are subsequently electron-optically processed to form a high spatial resolution electron optical image of that fraction of the surface through which they emerged into the vacuum. However, the information about the sample under investigation that can be extracted from such type of electron microscopy is limited to the surface and few monolayers of the material right below it. This is because under these conditions the mean free path of the electrons (with sufficient energies to escape into vacuum) is extremely small (well below some 50 Angstroms).

In the proposed version of this experimental method according to the present invention, the electrons that leave the sample (QB-Sem region in FIG. 24) through the surface S3, have been injected to the said QB-semiconductor already at the surface S2 and therefore they carry the information about the conditions of the sample along the whole of their quasi-ballistic trajectory within the sample. Any imperfections and/or defects (these may be of one, two and/or three-dimensional variety) will cause their scattering (and their subsequent thermalising) away from their quasi-ballistic straight trajectories. This creates a projection-type of contrast in the electron-optical image plane.

Figure 24:
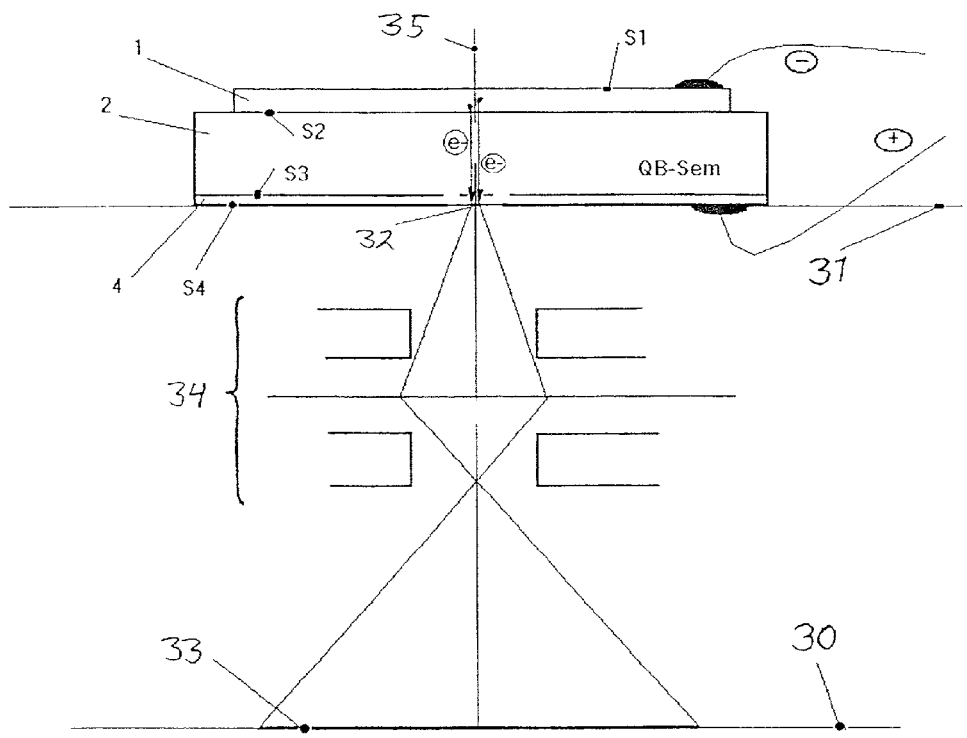
FIG. 24 is a schematic drawing according to the embodiment of an Electron Cold mission Microscopy (ECEM).

One of the possible preferred embodiments of the said Electron Cold Emission Microscopy according to the present invention is shown schematically in FIG. 24. The basic structure of the present invention (cathode, QB-semiconductor, anode—see also FIGS. 1 and 2) is preserved also in this case, only now the said basic structure forms a sample to be investigated. Furthermore the metal electrodes facing the QB-semiconductor surface S2 and S3 are not really necessary, provided that the electrical field of sufficient strength can be generated within QB-semiconductor body and the electrons can be injected into the QB-semiconductor through the surface S2. In such configuration the whole process of virgin defect quality control can be performed contactless. These injected electrons travel along their straight, quasi-ballistic trajectories and those not deflected by imperfections, impurities, defects and/or other irregularities, will eventually emerge into vacuum through the surface S3 of the QB-semiconductor. The surface density of these electrons, their energies and the angle of their emergence are the parameters (quantities) that are related to the precise quasi-ballistic electrons' interaction with the surface S2, with the bulk of the QB-semiconductor along their trajectory and with the surface S3.

The electrons emerging through the segment 32 of the surface S4 are then processed by standard electron optics 34 to form high spatial resolution (magnified) electron-optical image 33 of the said segment in the electron-optical image plane 30

By placing the QB-semiconductor on a high precision x, y stage, the whole wafer can be investigated in this way down to 10 to 50 Angstroms standard resolution of a typical scanning electron microscope.

Example 7

Electron Beam Sources in General

Although the present invention (planar electron emitter) is primarily targeted towards applications that require and/or benefit from the two-dimensional nature of the said invention, the present invention characteristics (such as low power dissipation, simplicity of construction, high electron emission current density and room temperature operation) make the use of the present invention in the construction of more standard electron beam sources also very attractive. Pointed, patterned, quasi-planar and general shape electron sources can be manufactured with ease and are termed here as "Cold Schottky Cathodes". Their typical use will be as electron sources for Cathode Ray Tubes (CRT), x-ray tubes, Electron microscopes inclusive electron guns for evaporation, welding, imaging and possibly other electron beam applications.

Since all these applications are considered as trivial use of the present invention and because they are well known and described in the corresponding prior art, they will not be discussed here in more detail.

The invention claimed is:

1. An article comprising
an element having a first and a second surface, wherein
the first surface is adapted to hold a first electrical charge, and wherein the second surface is adapted to hold a second electrical charge, the first surface being substantially parallel to the second surface,
means for providing an electric field across at least part of the element, said means comprising
means for providing the first electrical charge to the first surface of the element, and
means for providing the second electrical charge to the second surface of the element, the second electrical charge being different from the first electrical charge in order to move electrons in a direction substantially perpendicular to the first or the second surface,
wherein
the element comprises a material or a material system being prepared so as to reduce electron scattering within the material or material system by having a predetermined crystal orientation perpendicular to the first or second surface, and by having an impurity concentration of less than $10^{14}$ cm$^{-3}$, and
the material layer has a thickness in a direction at least substantially perpendicular to the first or the second surface, which is equal to or larger than 0.2 μm.

2. An article according to claim 1, wherein the material or material system comprises a semiconductor material, such as silicon, germanium, silicon carbide, gallium arsenide, indium phosphide, indium antimonide, indium arsenide, aluminium arsenide, zinc telluride or silicon nitride or any combination thereof.

3. An article according to claim 1, wherein the preparation of the material or material system comprises doping the material or material system with a dopant so as to obtain a predetermined doping level.

4. An article according to claim 3, wherein the dopant comprises phosphorus, lithium, antimony, arsenic, boron, aluminium, tantalum, gallium, indium, bismuth, silicon, germanium, sulfur, tin, tellurium, selenium, carbon, beryllium, magnesium, zinc or cadmium or any combination thereof.

5. An article according to claim 3, wherein the predetermined doping level is less than $1\times10^{18}$ cm$^{-3}$, such as less than $1\times10^{14}$ cm$^{-3}$, such as less than $1\times10^{13}$ cm$^{-3}$, such as less than $1\times10^{12}$ cm$^{-3}$.

6. An article according to claim 1, wherein the means for providing the first electrical charge to the first surface comprises an at least partly conductive first material or material system.

7. An article according to claim 1, wherein the means for providing the second electrical charge to the second surface comprises an at least partly conductive second material or material system.

8. An article according to claim 6, wherein the at least partly conductive first material or material system constitutes a layer having a first and a second surface, wherein the second surface is operationally connected to a first terminal of a charge reservoir and wherein the first surface is in direct contact with the first surface of the material or material system of the element.

9. An article according to claim 7, wherein the at least partly conductive second material or material system constitutes a layer having a first and a second surface, wherein the first surface is operationally connected to a second terminal of the charge reservoir and wherein the second surface is in direct contact with the second surface of the material or material system of the element.

10. An article according to claim 6, wherein the at least partly conductive first and second material or material system comprises a metal or a highly doped semiconductor material with a doping level higher than $1\times10^{17}$ cm$^{-3}$.

11. An article according to claim 10, wherein the at least partly conductive first and second material or material system comprises gold, chromium, platinum, aluminium, copper, cesium, rubidium, strontium, indium, praseodymium, samarium, ytterbium, francium or europium or any combination thereof.

12. An article according to claim 1, wherein the electrons comprise quasi-ballistic electrons.

13. A flat panel display comprising
an article according to claim 1, the article further comprising
a layer of material being adapted to emit light at a plurality of wavelengths upon exposure of electrons, said material layer defining, in a plane substantially parallel to the first and second surface of the element, a two-dimensional matrix having one or more surface elements, each surface element being adapted to emit light at a predetermined wavelength, and
means for selectively proving electrons to the one or more surface elements in the two-dimensional matrix.

14. A flat panel display according to claim 13, wherein the material layer for emitting the plurality of wavelengths comprise an appropriate luminophors or standard colour television phosphors.

15. A flat panel display according to claim 13, wherein the emitted light comprises at least three wavelengths corresponding to at least three colours.

16. A flat panel display according to claim 15, wherein any colour may be deduced from a combination of the at least three colours emitted from the layer.

17. A flat panel display according to claim 13, wherein the emitted wavelengths corresponds to colours red, yellow and blue, or to colours red, green and blue.

18. A flat panel display according to claim 13, wherein the electrons comprise quasi-ballistic electrons.

19. A flat panel display according to claim 13, wherein the selective means comprises a pattern so as to define, in a plane substantially parallel to the first or second surface, a two-dimensional matrix of electrically controllable matrix elements, said pattern being formed of the at least partly conductive material or material system.

20. An article comprising
an element having a first and a second surface area, wherein
the first surface area is adapted to hold a first electrical charge, and wherein the second surface area is adapted to hold a second electrical charge,
means for providing an electric field across at least part of the element, said means comprising
means for providing the first electrical charge to the first surface area of the element, and
means for providing the second electrical charge to the second surface area of the element, the second electrical charge being different from the first electrical charge in order to move electrons between the first surface area and the second surface area,
wherein
the element comprises a material or a material system being prepared so as to reduce electron scattering within the material or material system, by having a predetermined crystal orientation perpendicular to the first or second surface, and by having an impurity concentration of less than $10^{14}$ cm$^{-3}$, and the material layer has a thickness in a direction at least substantially perpendicular to the first or the second surface, which is equal to or larger than 0.2 μm.

21. An article according to claim 20, wherein the material or material system comprises a semiconductor material, such as silicon, germanium, silicon carbide, gallium arsenide, indium phosphide, indium antimonide, indium arsenide, aluminium arsenide, zinc telluride or silicon nitride or any combination thereof.

22. An article according to claim 20, wherein the preparation of the material or material system comprises doping the material or material system with a dopant so as to obtain a predetermined doping level.

23. An article according to claim 22, wherein the dopant comprises phosphorus, lithium, antimony, arsenic, boron, aluminium, tantalum, gallium, indium, bismuth, silicon, germanium, sulfur, tin, tellurium, selenium, carbon, beryllium, magnesium, zinc or cadmium or any combination thereof.

24. An article according to claim 22, wherein the predetermined doping level is less than $1\times10^{18}$ cm$^{-3}$, such as less than $1\times10^{14}$ cm$^{-3}$, such as less than $1\times10^{13}$ cm$^{-3}$, such as less than $1\times10^{12}$ cm$^{-3}$.

25. An article according to claim 20, wherein the means for providing the first electrical charge to the first surface comprises an at least partly conductive first material or material system.

26. An article according to claim 20, wherein the means for providing the second electrical charge to the second surface comprises an at least partly conductive second material or material system.

27. An article according to claim 25, wherein the at least partly conductive first material or material system constitutes a layer having a first and a second surface, wherein the second surface is operationally connected to a first terminal of a charge reservoir and wherein the first surface is in direct contact with the first surface of the material or material system of the element.

28. An article according to claim 26, wherein the at least partly conductive second material or material system constitutes a layer having a first and a second surface, wherein the first surface is operationally connected to a second terminal of the charge reservoir and wherein the second surface is in direct contact with the second surface of the material or material system of the element.

29. An article according to claim 24, wherein the at least partly conductive first and second material or material system comprises a metal or a highly doped semiconductor with a doping level higher than $1\times10^{17}$ cm$^{-3}$.

30. An article according to claim 28, wherein the at least partly conductive first and second material or material system comprises gold, chromium, platinum, aluminium, copper, cesium, rubidium, strontium, indium, praseodymium, samarium, ytterbium, francium or europium or any combination thereof.

31. An article according to claim 20, wherein the electrons comprise quasi-ballistic electrons.

* * * * *